United States Patent
Kim et al.

(10) Patent No.: US 10,396,899 B1
(45) Date of Patent: Aug. 27, 2019

(54) PROBABILISTIC CONSTELLATION SHAPING USING SET-PARTITIONED M-QAM

(71) Applicant: Fujitsu Limited, Kawasaki-shi, Kanagawa (JP)

(72) Inventors: Inwoong Kim, Allen, TX (US); Olga I. Vassilieva, Plano, TX (US); Paparao Palacharla, Richardson, TX (US); Tadashi Ikeuchi, Plano, TX (US)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 16/107,141

(22) Filed: Aug. 21, 2018

(51) Int. Cl.
- *H04B 10/04* (2006.01)
- *H04B 10/54* (2013.01)

(52) U.S. Cl.
CPC .................. *H04B 10/541* (2013.01)

(58) Field of Classification Search
CPC .............. H04B 10/516; H04B 10/5561; H04B 10/564; H04B 10/541; H04B 10/548; H04B 10/2507; H04B 10/616; H04B 10/6165; H04B 10/5055
USPC ....... 398/183, 186, 188, 187, 192, 193, 194, 398/135, 136, 158, 159, 202, 208, 209
See application file for complete search history.

(56) References Cited

U.S. PATENT DOCUMENTS

2013/0071119 A1* 3/2013 Liu .................. H04B 10/25137
398/65
2015/0372766 A1* 12/2015 Yoshida ............. H04B 10/2507
398/193

OTHER PUBLICATIONS

Yoshida, Tsuyoshi, et al., "Short-Block-Length Shaping by Simple Mark Ratio Controllers for Granular and Wide-Range Spectral Efficiencies," 43rd European Conference on Optical Communication (ECOC 2017), Gothenburg, Sweden, 3 pages, Sep. 2017.

(Continued)

*Primary Examiner* — Hanh Phan
(74) *Attorney, Agent, or Firm* — Baker Botts L.L.P.

(57) ABSTRACT

Systems and methods for constellation shaping of M-QAM modulation formats in optical transport networks may receive binary data to be transmitted as an optical signal and partition symbols of an M-QAM constellation in the complex plane into two non-overlapping subsets of symbols, The systems and methods may include assigning respective probabilities to each symbol in the first subset of symbols dependent on a target probability distribution for the first subset, mapping at least a portion of the received binary data to the symbols in the first subset, including generating a respective codeword for each symbol in the first subset, in a first symbol period, providing data representing the respective codewords mapped to the symbols in the first subset to an optical modulator for transmission, and refraining from providing any data representing codewords mapped to the symbols in the second subset to the optical modulator until a second symbol period.

20 Claims, 16 Drawing Sheets

(56) References Cited

OTHER PUBLICATIONS

Buchali, Fred, et al., "Rate Adaptation and Reach Increase by Probabilistically Shaped 64-QAM: An Experimental Demonstration," Journal of Lightwave Technology, vol. 34, No. 7, Apr. 1, 2016, 11 pages.

Böcherer Georg, et al., "High Throughput Probabilistic Shaping with Product Distribution Matching," arXiv:1702.07510 [cs.IT], 9 pages, Feb. 24, 2017.

Schulte, Patrick, et al., "Constant Composition Distribution Matching," IEEE Transactions on Information Theory, vol. 62, No. 1, Jan. 2016.

\* cited by examiner

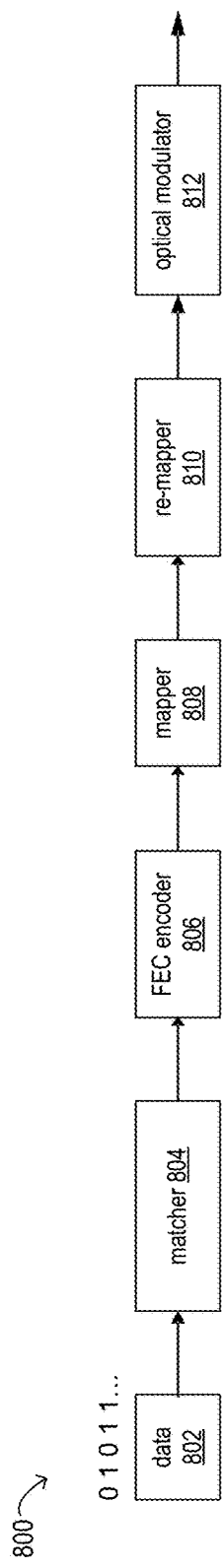
FIG. 8A
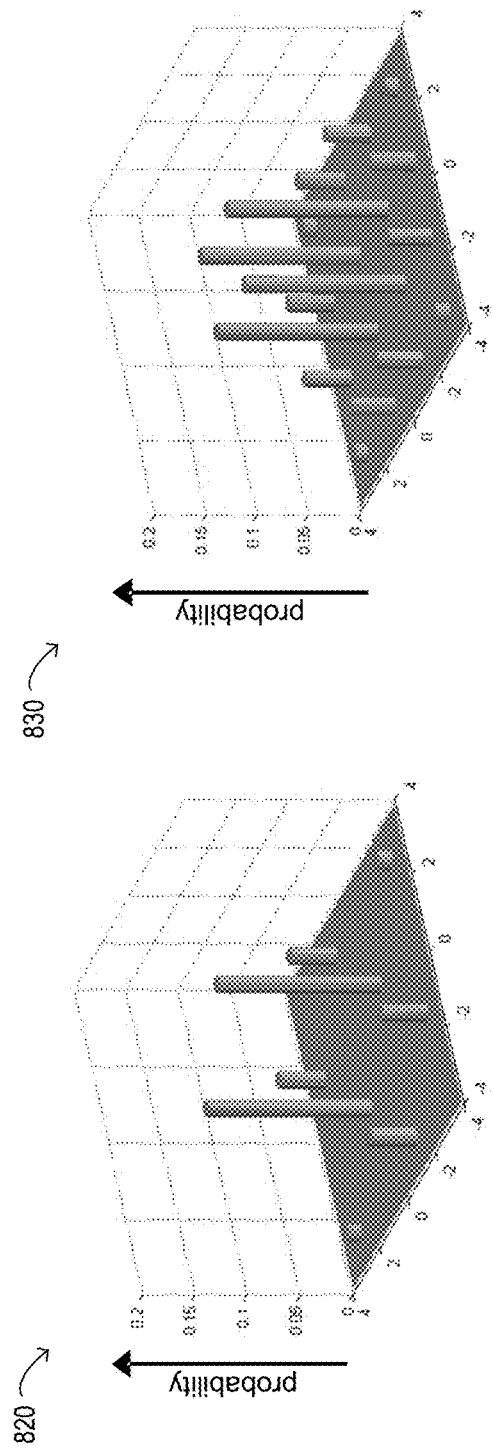
FIG. 8B
FIG. 8C

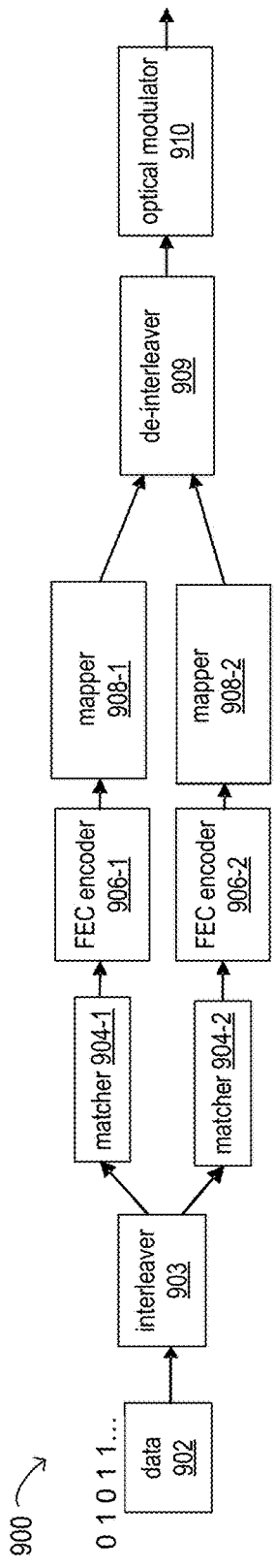
FIG. 9A
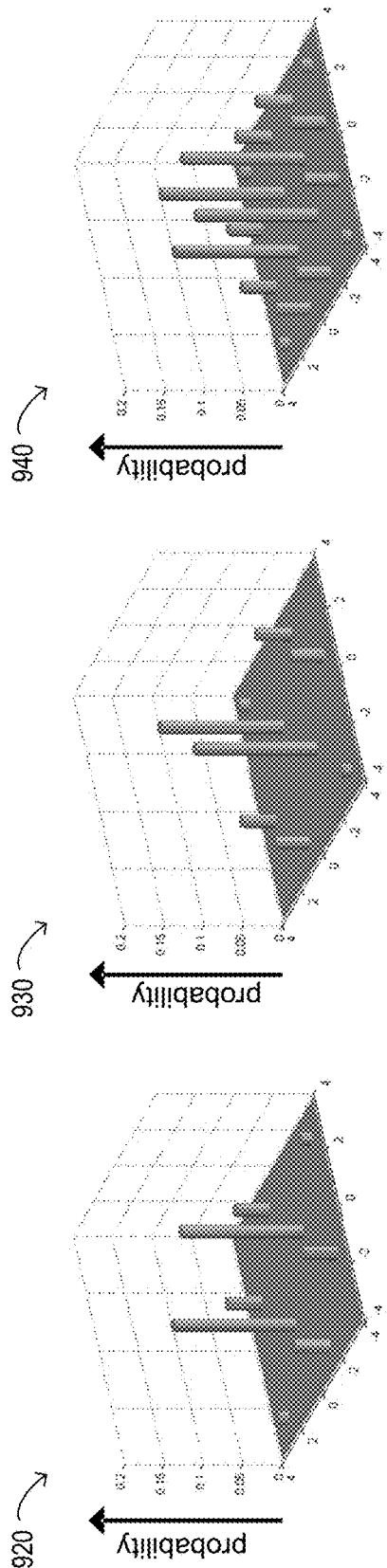
FIG. 9B
FIG. 9C
FIG. 9D

PROBABILISTIC CONSTELLATION SHAPING USING SET-PARTITIONED M-QAM

BACKGROUND

Field of the Disclosure

The present disclosure relates generally to optical communication networks and, more particularly, to constellation shaping of modulation formats for optical communication systems.

Description of the Related Art

Telecommunications systems, cable television systems and data communication networks use optical networks to rapidly convey large amounts of information between remote points. In an optical network, information is conveyed in the form of optical signals through optical fibers. Optical networks may also include various network nodes such as amplifiers, dispersion compensators, multiplexer/demultiplexer filters, wavelength selective switches, couplers, etc. to perform various operations within the network.

Optical superchannels are an emerging solution for transmission of optical signals at 400 Gb/s and 1 Tb/s data rate per channel, and hold promise for even higher data rates in the future. A typical superchannel includes a set of subcarriers that are frequency multiplexed to form a single wavelength channel. The superchannel may then be transmitted through an optical network as a single channel across network endpoints. The subcarriers within the superchannel are tightly packed to achieve high spectral efficiency, enabling superchannels to achieve an increase in data capacity. However, the reach of optical signals, even when using superchannels, may still be limited by optical signal-to-noise ratio (OSNR) levels experienced during transmission.

SUMMARY

In one aspect, a method for constellation shaping of M-QAM modulation formats in optical transport networks includes receiving binary data to be transmitted as an optical signal, and partitioning symbols of an M-QAM constellation in the complex plane into two non-overlapping subsets of symbols, the two subsets of symbols collectively including all symbols of the M-QAM constellation. The method also includes assigning respective probabilities to each symbol in a first one of the two subsets of symbols dependent on a target probability distribution for the first subset of symbols, mapping at least a portion of the received binary data to the symbols in the first subset, the mapping including generating a respective codeword for each symbol in the first subset, and in a first symbol period, providing data representing the respective codewords mapped to the symbols in the first subset to an optical modulator for transmission, and refraining from providing any data representing codewords mapped to the symbols in the second subset to the optical modulator.

In any of the disclosed embodiments, the symbols in the first subset may be mirror images of the symbols in the second subset with respect to the I axis or the Q axis in the complex plane.

In any of the disclosed embodiments, each of the codewords may include the same number of bits, and the respective codewords for neighboring symbols in the first subset may differ from each other in only one bit position.

In any of the disclosed embodiments, the value in the one bit position may represent an error correction encoding.

In any of the disclosed embodiments, the method may further include determining a respective codeword for each symbol in the second subset, and in a second symbol period, providing the respective codewords for the symbols in the second subset to the optical modulator for transmission.

In any of the disclosed embodiments, within alternating odd and even time slots, the first symbol period may represent an odd time slot and the second symbol period may represent an even time slot.

In any of the disclosed embodiments, generating a respective codeword for each symbol in the first subset may include generating the codeword at a matcher element of a transmitter, and determining a respective codeword for each symbol in the second subset may include re-mapping a codeword generated for a given symbol in the first subset to a given symbol in the second subset that mirrors the given symbol in the first subset with respect to the I axis or the Q axis in the complex plane.

In any of the disclosed embodiments, generating a respective codeword for each symbol in the first subset may include generating the codeword at a first matcher element of a transmitter, and generating a respective codeword for each symbol in the first subset may include generating the codeword at a second matcher element of the transmitter.

In any of the disclosed embodiments, the method may further include receiving, at a coherent receiver in a third symbol period, codewords for the first subset, receiving, at the coherent receiver in a fourth symbol period, codewords for the second subset, re-mapping the codewords for the first subset to symbols in the second subset that mirror the symbols in the first subset with respect to the I axis or the Q axis in the complex plane, and performing one or more of de-mapping, decoding, and de-matching the codewords for the first subset and the second subset to recover the at least a portion of the binary data.

In any of the disclosed embodiments, the method may further include receiving, at a coherent receiver in a third symbol period, an optical signal representing codewords for the first subset, receiving, at the coherent receiver in a fourth symbol period, an optical signal representing codewords for the second subset, directing the codewords for the first subset to a first processing path and the codewords from the second subset to a second processing path, performing, by elements of the first processing path and the second processing path, one or more of de-mapping, decoding, and de-matching the codewords for the first subset and the codewords for the second subset, respectively, and combining outputs of the first processing path and the second processing path to recover the at least a portion of the binary data.

In another aspect, an optical transport network for constellation shaping of M-QAM modulation format includes an optical transmission path, including an optical transmitter and an optical receiver. The optical transmitter may be configured to receive binary data to be transmitted as an optical signal, and to partition symbols of an M-QAM constellation of a given M-QAM modulation format in the complex plane into two non-overlapping subsets of symbols, the two subsets of symbols collectively including all symbols of the M-QAM constellation. The optical transmitter may also be configured to assign, by a matcher element, respective probabilities to each symbol in a first one of the two subsets of symbols dependent on a target probability distribution for the first subset of symbols, to map, by a mapper element, at least a portion of the received binary data to the symbols in the first subset, the mapping including generating a respective codeword for each symbol in the first subset and, in a first symbol period, to provide data representing the respective codewords mapped to the symbols in the first subset to an optical modulator for transmission over the optical channel, and to refrain from providing any data representing codewords mapped to the symbols in the second subset to the optical modulator.

In any of the disclosed embodiments, the symbols in the first subset may be mirror images of the symbols in the second subset with respect to the I axis or the Q axis in the complex plane.

In any of the disclosed embodiments, each of the codewords may include the same number of bits, the respective codewords for neighboring symbols in the first subset may differ from each other in only one bit position, and the value in the one bit position may represent an error correction encoding.

In any of the disclosed embodiments, the optical transmitter may be further configured to determine a respective codeword for each symbol in the second subset and, in a second symbol period, to provide the respective codewords for the symbols in the second subset to the optical modulator for transmission.

In any of the disclosed embodiments, within alternating odd and even time slots, the first symbol period may represent an odd time slot and the second symbol period may represent an even time slot.

In any of the disclosed embodiments, the optical transmitter may include a matcher element configured to generate the respective codeword for each symbol in the first subset, and to determine the respective codeword for each symbol in the second subset. The optical transmitter may include a re-mapping element configured to re-map a codeword generated for a given symbol in the first subset to a given symbol in the second subset that mirrors the given symbol in the first subset with respect to the I axis or the Q axis in the complex plane.

In any of the disclosed embodiments, the optical transmitter may include a first matcher element configured to generate the respective codeword for each symbol in the first subset, and a second matcher element configured to generate the respective codeword for each symbol in the second subset.

In any of the disclosed embodiments, the optical receiver may be configured to receive, in a third symbol period, codewords for the first subset, to receive, in a fourth symbol period, codewords for the second subset, to re-map the codewords for the first subset to symbols in the second subset that mirror the symbols in the first subset with respect to the I axis or the Q axis in the complex plane, and to perform one or more of de-mapping, decoding, and de-matching the codewords for the first subset and the second subset to recover the at least a portion of the binary data.

In any of the disclosed embodiments, the optical receiver may be configured to receive, in a third symbol period, an optical signal representing codewords for the first subset, to receive, in a fourth symbol period, an optical signal representing codewords for the second subset, to direct the codewords for the first subset to a first processing path of the optical receiver and the codewords from the second subset to a second processing path of the optical receiver, to perform, by elements of the first processing path and the second processing path, one or more of de-mapping, decoding, and de-matching the codewords for the first subset and the codewords for the second subset, respectively, and to combine outputs of the first processing path and the second processing path to recover the at least a portion of the binary data.

In any of the disclosed embodiments, the optical transport network may further include a network management system configured to send a first command to the optical transmitter to use the given M-QAM modulation format for an optical channel transmitted over the optical transmission path and to activate constellation shaping using set partitioning for the optical channel, and to send a second command to the optical receiver to use the given M-QAM modulation format for the optical channel and to activate constellation shaping using set partitioning for the optical channel.

BRIEF DESCRIPTION OF THE DRAWINGS

For a more complete understanding of the present invention and its features and advantages, reference is now made to the following description, taken in conjunction with the accompanying drawings, in which:

FIG. 8A illustrates selected elements on the transmitter side of an optical path for probabilistic shaping using set partitioned M-QAM (PS-SP-M-QAM), according to some embodiments;

FIG. 8B illustrates an example probability distribution diagram for the constellation points of a first partition of symbols for M-QAM as partitioned by a matcher, according to some embodiments;

FIG. 8C illustrates an example probability distribution diagram for the combined symbols of a first partition of symbols and a second partition of symbols for M-QAM, according to some embodiments;

FIGS. 9A through 9D illustrate the use of parallel processing for probabilistic shaping using set partitioned M-QAM on the transmitter side of an optical path, according to some embodiments;

DESCRIPTION OF THE EMBODIMENT(S)

In the following description, details are set forth by way of example to facilitate discussion of the disclosed subject matter. It should be apparent to a person of ordinary skill in the field, however, that the disclosed embodiments are exemplary and not exhaustive of all possible embodiments.

Figure 1:
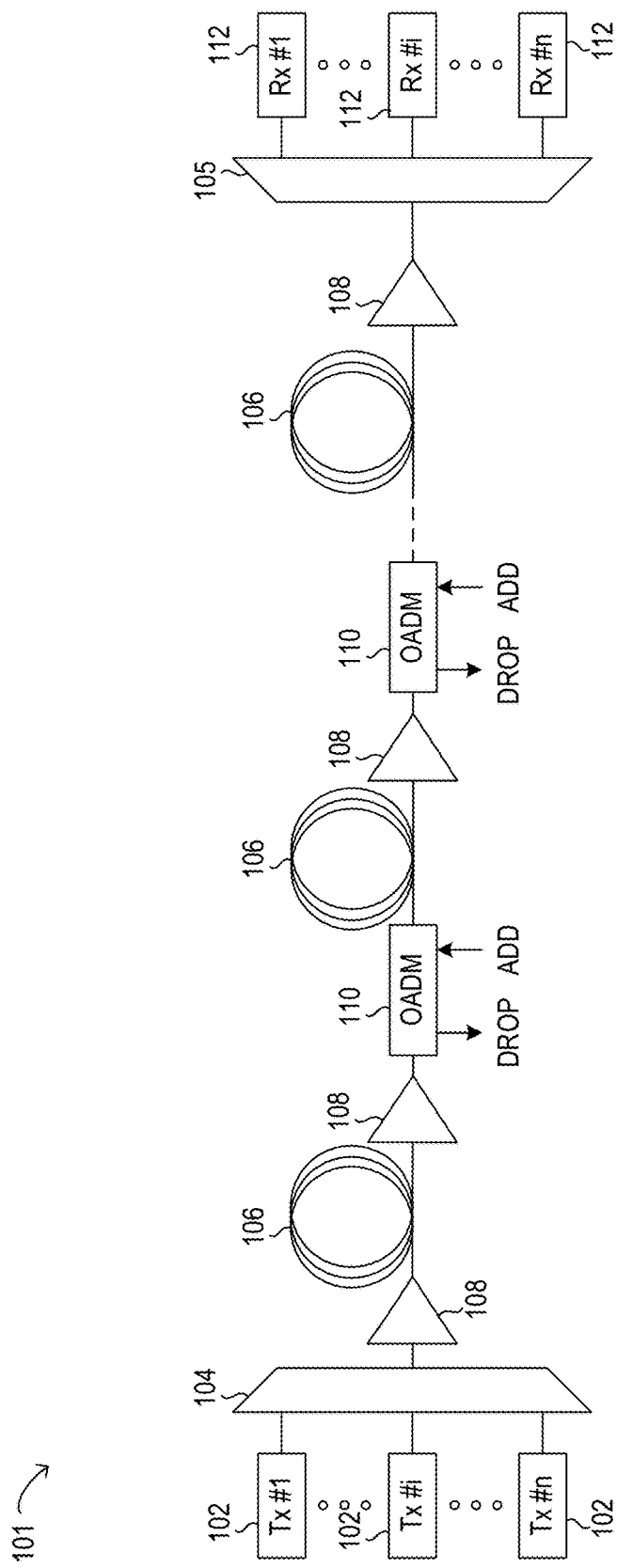
FIG. 1 is a block diagram of selected elements of an embodiment of an optical transport network.

Referring now to the drawings, FIG. 1 illustrates an example embodiment of optical transport network (OTN) 101, which may represent an optical communication system. Optical transport network 101 included one or more optical fibers 106 to transport one or more optical signals communicated by components of optical transport network 101. The network elements of optical transport network 101, coupled together by fibers 106, may comprise one or more transmitters (Tx) 102, one or more multiplexers (MUX) 104, one or more optical amplifiers 108, one or more optical add/drop multiplexers (OADM) 110, one or more demultiplexers (DEMUX) 105, and one or more receivers (Rx) 112.

Optical transport network 101 may comprise a point-to-point optical network with terminal nodes, a ring optical network, a mesh optical network, or any other suitable optical network or combination of optical networks. Optical transport network 101 may be used in a short-haul metropolitan network, a long-haul inter-city network, or any other suitable network or combination of networks. The capacity of optical transport network 101 may include, for example, 100 Gbit/s, 400 Gbit/s, or 1 Tbit/s. Optical fibers 106 comprise thin strands of glass capable of communicating the signals over long distances with very low loss. Optical fibers 106 may comprise a suitable type of fiber selected from a variety of different fibers for optical transmission. Optical fibers 106 may include any suitable type of fiber, such as a standard Single-Mode Fiber (SMF), Enhanced Large Effective Area Fiber (E-LEAF), or TrueWave® Reduced Slope (TW-RS) fiber, among others.

Optical transport network 101 may include devices to transmit optical signals over optical fibers 106. Information may be transmitted and received through optical transport network 101 by modulation of one or more wavelengths of light to encode the information on the wavelength. In optical networking, a wavelength of light may also be referred to as a "channel" that is included in an optical signal. Each channel may carry a certain amount of information through optical transport network 101.

To increase the information capacity and transport capabilities of optical transport network 101, multiple signals transmitted at multiple channels may be combined into a single wide bandwidth optical signal. The process of communicating information at multiple channels is referred to in optics as wavelength division multiplexing (WDM). Coarse wavelength division multiplexing (CWDM) refers to the multiplexing of wavelengths that are widely spaced having low number of channels, usually greater than 20 nm and less than sixteen wavelengths, and dense wavelength division multiplexing (DWDM) refers to the multiplexing of wavelengths that are closely spaced having large number of channels, usually less than 0.8 nm spacing and greater than forty wavelengths, into a fiber. WDM or other multi-wavelength multiplexing transmission techniques are employed in optical networks to increase the aggregate bandwidth per optical fiber. Without WDM, the bandwidth in optical networks may be limited to the bit-rate of solely one wavelength. With more bandwidth, optical networks are capable of transmitting greater amounts of information. Optical transport network 101 may transmit disparate channels using WDM or some other suitable multi-channel multiplexing technique, and to amplify the multi-channel signal.

Recently, advancements in DWDM enabled combining several optical carriers to create a composite optical signal of a desired capacity. One such example of a multi-carrier optical signal is a superchannel, which is an example of high spectral efficiency (SE) that may attain transmission rates of 100 Gb/s, 400 Gb/s, 1 Tb/s, or higher. Thus, in a superchannel, subcarriers are tightly packed and consume less optical spectrum than in conventional DWDM. Another distinctive feature of superchannels is that the subcarriers in a superchannel travel from the same origin to the same destination, and are not added or removed using an OADM while in transmission. Techniques for achieving high spectral efficiency (SE) in optical networks may include the use of superchannels modulated using dual-polarization quadrature phase-shift keying (DP-QPSK) for long-haul transmission at data rates of 100 Gb/s or greater. In particular embodiments, Nyquist wavelength-division multiplexing (N-WDM) may be used in a superchannel. In N-WDM, optical pulses having a nearly rectangular spectrum are packed together in the frequency domain with a bandwidth approaching the baud rate (see also FIG. 2).

Optical transport network 101 may include one or more optical transmitters (Tx) 102 to transmit optical signals through optical transport network 101 in specific wavelengths or channels. Transmitters 102 may comprise a system, apparatus or device to convert an electrical signal into an optical signal and transmit the optical signal. For example, transmitters 102 may each comprise a laser and a modulator to receive electrical signals and modulate the information contained in the electrical signals onto a beam of light produced by the laser at a particular wavelength, and transmit the beam for carrying the signal throughout optical transport network 101. In some embodiments, optical transmitter 102 may be used to determine the baud rate for the data to be transmitted during the optical modulation. An example of transmitter 102 for applying different baud rates is an adaptive rate transponder. An example of transmitter 102 for applying different modulation formats is a universally programmable transceiver. Additionally, a forward error correction (FEC) module may be included in optical transmitter 102, or may be used in conjunction with optical transmitter 102. The FEC module may process the electrical signal carrying the information or data to be transmitted to include error correction codes. The FEC module at transmitter 102 may also determine a baud rate for sending the data to be transmitted to optical transmitter 102 for optical modulation.

Multiplexer 104 may be coupled to transmitters 102 and may be a system, apparatus or device to combine the signals transmitted by transmitters 102, e.g., at respective individual wavelengths, into a WDM signal.

Optical amplifiers 108 may amplify the multi-channeled signals within optical transport network 101. Optical amplifiers 108 may be positioned before and after certain lengths of fiber 106, which is referred to as "in-line amplification".

Optical amplifiers 108 may comprise a system, apparatus, or device to amplify optical signals. For example, optical amplifiers 108 may comprise an optical repeater that amplifies the optical signal. This amplification may be performed with opto-electrical or electro-optical conversion. In some embodiments, optical amplifiers 108 may comprise an optical fiber doped with a rare-earth element to form a doped fiber amplification element. When a signal passes through the fiber, external energy may be applied in the form of a pump signal to excite the atoms of the doped portion of the optical fiber, which increases the intensity of the optical signal. As an example, optical amplifiers 108 may comprise an erbium-doped fiber amplifier (EDFA). However, any other suitable amplifier, such as a semiconductor optical amplifier (SOA), may be used.

OADMs 110 may be coupled to optical transport network 101 via fibers 106. OADMs 110 comprise an add/drop module, which may include a system, apparatus or device to add and drop optical signals (i.e., at individual wavelengths) from fibers 106. After passing through an OADM 110, an optical signal may travel along fibers 106 directly to a destination, or the signal may be passed through one or more additional OADMs 110 and optical amplifiers 108 before reaching a destination. In this manner, OADMs 110 may enable connection of different optical transport network topologies together, such as different rings and different linear spans.

In certain embodiments of optical transport network 101, OADM 110 may represent a reconfigurable OADM (ROADM) that is capable of adding or dropping individual or multiple wavelengths of a WDM signal. The individual or multiple wavelengths may be added or dropped in the optical domain, for example, using a wavelength selective switch (WSS) (not shown) that may be included in a ROADM.

Many existing optical networks are operated at 10 gigabit-per-second (Gbps) or 40 Gbps signal rates with 50 gigahertz (GHz) of channel spacing in accordance with International Telecommunications Union (ITU) standard wavelength grids, also known as fixed-grid spacing, which is compatible with conventional implementations of optical add-drop multiplexers (OADMs) and with conventional implementations of demultiplexers 105. However, as data rates increase to 100 Gbps and beyond, the wider spectrum requirements of such higher data rate signals often require increasing channel spacing. In traditional fixed grid networking systems supporting signals of different rates, the entire network system typically must be operated with the coarsest channel spacing (100 GHz, 200 GHz, etc.) that can accommodate the highest rate signals. This may lead to an over-provisioned channel spectrum for lower-rate signals and lower overall spectrum utilization.

Thus, in certain embodiments, optical transport network 101 may employ components compatible with flexible grid optical networking that enables specifying a particular frequency slot per channel. For example, each wavelength channel of a WDM transmission may be allocated using at least one frequency slot. Accordingly, one frequency slot may be assigned to a wavelength channel whose symbol rate is low, while a plurality of frequency slots may be assigned to a wavelength channel whose symbol rate is high. Thus, in optical transport network 101, ROADM 110 may be capable of adding or dropping individual or multiple wavelengths of a WDM, DWDM, or superchannel signal carrying data channels to be added or dropped in the optical domain. In certain embodiments, ROADM 110 may include or be coupled to a wavelength selective switch (WSS).

As shown in FIG. 1, optical transport network 101 may also include one or more demultiplexers 105 at one or more destinations of network 101. Demultiplexer 105 may comprise a system apparatus or device that acts as a demultiplexer by splitting a single composite WDM signal into individual channels at respective wavelengths. For example, optical transport network 101 may transmit and carry a forty (40) channel DWDM signal. Demultiplexer 105 may divide the single, forty channel DWDM signal into forty separate signals according to the forty different channels. It will be understood that different numbers of channels or subcarriers may be transmitted and demultiplexed in optical transport network 101, in various embodiments.

In FIG. 1, optical transport network 101 may also include receivers 112 coupled to demultiplexer 105. Each receiver 112 may receive optical signals transmitted at a particular wavelength or channel, and may process the optical signals to obtain (demodulate) the information (data) that the optical signals contain. Accordingly, network 101 may include at least one receiver 112 for every channel of the network. As shown, receivers 112 may demodulate the optical signals according to a baud rate used by transmitter 102. In some embodiments, receiver 112 may include, or may be followed by, a forward error correction (FEC) module to use the error correction codes to check the integrity of the received data. The FEC module may also correct certain errors in the data based on the error correction codes. The FEC module at receiver 112 may also demodulate the data at a specific baud rate defined for each channel at transmitter 102, as described above.

Optical networks, such as optical transport network 101 in FIG. 1, may employ modulation techniques to convey information in the optical signals over the optical fibers. Such modulation schemes may include phase-shift keying (PSK), frequency-shift keying (FSK), amplitude-shift keying (ASK), and quadrature amplitude modulation (QAM), among other examples of modulation techniques. In PSK, the information carried by the optical signal may be conveyed by modulating the phase of a reference signal, also known as a carrier wave, or simply, a carrier. The information may be conveyed by modulating the phase of the signal itself using two-level or binary phase-shift keying (BPSK), four-level or quadrature phase-shift keying (QPSK), multi-level phase-shift keying (M-PSK) and differential phase-shift keying (DPSK). In QAM, the information carried by the optical signal may be conveyed by modulating both the amplitude and phase of the carrier wave. PSK may be considered a subset of QAM, wherein the amplitude of the carrier waves is maintained as a constant.

PSK and QAM signals may be represented using a complex plane with real and imaginary axes on a constellation diagram. The points on the constellation diagram representing symbols carrying information may be positioned with uniform angular spacing around the origin of the diagram. The number of symbols to be modulated using PSK and QAM may be increased and thus increase the information that can be carried. The number of signals may be given in multiples of two. As additional symbols are added, they may be arranged in uniform fashion around the origin. PSK signals may include such an arrangement in a circle on the constellation diagram, meaning that PSK signals have constant power for all symbols. QAM signals may have the same angular arrangement as that of PSK signals, but include different amplitude arrangements. QAM signals may have their symbols arranged around multiple circles, meaning that the QAM signals include different power for different symbols. This arrangement may decrease the risk of noise as the symbols are separated by as much distance as possible. A number of symbols "m" may thus be used and denoted "m-PSK" or "M-QAM."

Examples of PSK and QAM with a different number of symbols can include binary PSK (BPSK or 2-PSK) using two phases at 0° and 180° (or in radians, 0 and π) on the constellation diagram; or quadrature PSK (QPSK, 4-PSK, or 4-QAM) using four phases at 0°, 90°, 180°, and 270° (or in radians, 0, π/2, π, and 3π/2). Phases in such signals may be offset. Each of 2-PSK and 4-PSK signals may be arranged on the constellation diagram. Certain m-PSK signals may also be polarized using techniques such as dual-polarization QPSK (DP-QPSK), wherein separate m-PSK signals are multiplexed by orthogonally polarizing the signals. Also, M-QAM signals may be polarized using techniques such as dual-polarization 16-QAM (DP-16-QAM), wherein separate M-QAM signals are multiplexed by orthogonally polarizing the signals.

Dual polarization technology, which may also be referred to as polarization division multiplexing (PDM), enables achieving a greater bit rate for information transmission. PDM transmission comprises simultaneously modulating information onto various polarization components of an optical signal associated with a channel, thereby nominally increasing the transmission rate by a factor of the number of polarization components. The polarization of an optical signal may refer to the direction of the oscillations of the optical signal. The term "polarization" may generally refer to the path traced out by the tip of the electric field vector at a point in space, which is perpendicular to the propagation direction of the optical signal.

In certain embodiments, optical transport network 101 may transmit a superchannel, in which a plurality of subcarriers (or subchannels or channels) are densely packed in a fixed bandwidth band and may be transmitted at very high data rates, such as 400 Gb/s, 1 Tb/s, or higher. Furthermore, the superchannel may be well suited for transmission over very long distances, such as hundreds of kilometers, for example. A typical superchannel may comprise a set of subcarriers that are frequency multiplexed to form a single channel that are transmitted through optical transport network 101 as one entity. The subcarriers within the superchannel may be tightly packed to achieve high spectral efficiency.

In an optical network, such as optical transport network 101 in FIG. 1, it is typical to refer to a management plane, a control plane, and a transport plane (sometimes called the physical layer). A central management host (see also FIG. 3) may reside in the management plane and may configure and supervise the components of the control plane. The management plane includes ultimate control over all transport plane and control plane entities (e.g., network elements). As an example, the management plane may consist of a central processing center (e.g., the central management host), including one or more processing resources, data storage components, etc. The management plane may be in electrical communication with the elements of the control plane and may also be in electrical communication with one or more network elements of the transport plane. The management plane may perform management functions for an overall system and provide coordination between network elements, the control plane, and the transport plane. As examples, the management plane may include an element management system (EMS) which handles one or more network elements from the perspective of the elements, a network management system (NMS) which handles many devices from the perspective of the network, or an operational support system (OSS) which handles network-wide operations.

Modifications, additions or omissions may be made to optical transport network 101 without departing from the scope of the disclosure. For example, optical transport network 101 may include more or fewer elements than those depicted in FIG. 1. Also, as mentioned above, although depicted as a point-to-point network, optical transport network 101 may comprise any suitable network topology for transmitting optical signals such as a ring, a mesh, or a hierarchical network topology.

In operation, optical transport network 101 represents a certain transmission capacity for data. As the demand for transmission capacity continues to increase, various methods may be employed to accommodate greater transmission capacity on optical transport network 101. For example, advanced modulation formats, such as 16-QAM or 64-QAM, may be used to increase transmission capacity per wavelength channel. The advanced modulation formats may be applied using transmitter 102 and receiver 112. However, the use of higher order modulation formats may result in decreased transmission reach (also referred to simply as 'reach') of the optical signal. For example, the reach may be determined by an acceptable value for bit error rate (BER), and accordingly OSNR, which may be observed at receivers 112.

Another strategy for increasing transmission capacity is the use of a superchannel, in which a plurality of subcarrier signals are densely packed in a fixed bandwidth band and may be transmitted at very high data rates, such as 400 Gb/s, 1 Tb/s, or higher. As noted above, optical superchannels may represent a promising solution for transmission of signals at 400 Gb/s and 1 Tb/s data rate per channel. However, as noted above, superchannels are typically used with flexible grid network components, which may not be universally available. Also, administration of superchannels may be associated with additional layers of network management, which may be undesirable in certain networks. While the use of superchannels typically enables an increase in transmission capacity, superchannels do not extend the transmission reach of optical signals using optical transport network 101.

In operation of optical transport network 101, in order to extend the transmission reach of certain optical signals, such as high capacity optical signals modulated using an advanced modulation format, constellation shaping may be applied to the optical signals. In constellation shaping, data bits are mapped and coded into improved constellations that may exhibit improved noise tolerance or increased OSNR. As a result of the improved noise tolerance, the reach of an optical signal in which constellation shaping has been applied may be increased, which is desirable for optical communication using optical transport network 101. In a typical modulation format (such as QPSK or M-QAM), the symbols exhibit a uniform distribution in the complex plane, shown as uniformly distribution constellation points in a constellation diagram. When constellation shaping is applied to a modulation formation, the distribution of the symbols in the complex plane is changed to provide an improved mapping for noise tolerance. In some instances, the distribution of symbols may be a Gaussian or Gaussian-like distribution that is shown as non-uniform constellation points in the constellation diagram (see also FIG. 5).

As noted above, transmitter 102 may be a universally programmable transceiver for applying different modulation formats, while receiver 112 may include the corresponding functionality for demodulation. Thus, transmitter 102 may support the use of constellation shaping and may be selectively programmed to apply constellation shaping on a per channel basis, while receiver 112 may correspondingly demodulate channels to which a certain kind of constellation shaping has been applied. In various embodiments, transmitter 102 and receiver 112 may include respective mapping/de-mapping functionality, such as within a digital signal processing (DSP) module, to enable implementation of constellation shaping in optical transport network 101.

In one example, constellation shaping may involve superposition mapping, as described in Equation 1.

$$y = y_I + jy_Q = \sum_{n=1}^{N} e^{j\pi b_n} h_n \qquad \text{Equation (1)}$$

In Equation 1:
y is the optical signal comprised of modulated symbols;
$y_I$ and $y_Q$ are the in-phase (real) and quadrature (imaginary) quadrature components;
N is the number of bits per symbol;
$b_n$ are the encoded binary bits; and
$h_n$ represents a weighted symbol mapping scheme, given by $h_n = \alpha_n e^{j\theta_n}$, where $\alpha_n$ is an amplitude power factor and $\theta_n$ is a phase power factor.

In this example, $h_n$ allocates a certain amplitude and phase to each symbol. By tuning the amplitude power factor $\alpha_n$ and the phase power factor $\theta_n$, different superposition mapping schemes can be implemented. For example, in superposition coded mapping using phase-shifted modulation (PSM), the amplitude power factor $\alpha_n$ is kept constant and the phase power factor $\theta_n$ is uniformly distributed in the complex plane. Additionally, different encoding schemes may be applied prior to superposition mapping, such as superposition coded mapping using bit-interleaved coded modulation. It is noted that when superposition mapping is used in a non-bijective (many-to-one) mapping, decoding and de-mapping at the receiver may involve iterative operations.

Other constellation shaping techniques include iterative polar modulation (IPM) and low-density parity check (LPDC) coded modulation with probabilistic shaping. Probabilistic shaping (PS) based on M-QAM has been studied as a way to control spectral efficiency with finer granularity and to achieve an improved performance closer to Shannon capacity limit. In one example, PS-M-QAM may be implemented using constant composition distribution matching (CCDM). Performing probabilistic shaping based on M-QAM may improve utilization of network resource. In some cases, the shaped profile follows a Maxwell-Boltzmann distribution. Using existing methods, the minimum entropy of probabilistic shaping based on M-QAM is 2 bits/symbol, which corresponds to QPSK, where entropy, as a measure of information, is defined as the number of bits of information contained in each message or symbol, where channel noise is not considered.

In optical transport network 101, constellation shaping may be activated/deactivated as a procedure in network operations on a per channel basis for a given optical path. In this manner, the available spectrum may be flexibly allocated in terms of bandwidth and constellation shaping to meet various traffic demands, based on specific path information (distance, number/type of co-propagating channels, fiber type, and dispersion map), which may be economically desirable. Furthermore, constellation shaping using universal programmable transceivers in optical transport network 101 may provide improvements in reach with the same electronics and optical components that are already available and installed, which may enable a rapid upgrade to implement constellation shaping.

As noted above, entropy may be defined as the number of bits of information contained in each message or symbol. Entropy may be calculated using the following equation:

$$H(X) = -\Sigma_i P(x_i) \log_2 P(x_1) \qquad \text{Equation (2)}$$

In Equation 1, X is a discrete random variable with M possible symbols $\{x_1, x_2, \ldots x_M\}$, and P(X) is a probability mass function representing the probability of each symbol assigned. For a uniform distribution, Equation 2 becomes:

$$H(X) = -\sum_{i=1}^{M} \frac{1}{M} \log_2 \frac{1}{M} \qquad \text{Equation (3)}$$

or $$\log_2 M = m(\text{bits/symbol}) \qquad \text{Equation (4)}$$

Figures 2A, 2B:
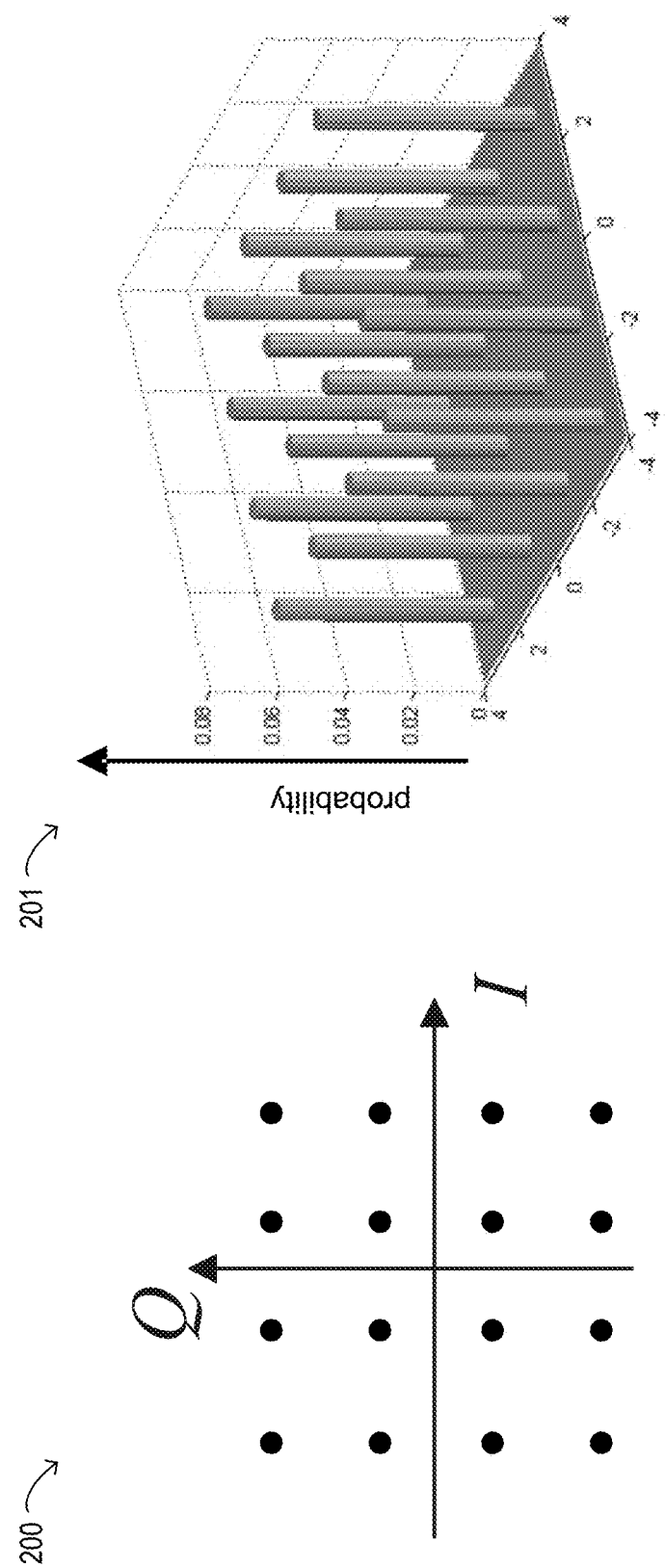
FIG. 2A illustrates selected elements of an embodiment of a constellation diagram in the complex plane.
FIG. 2B illustrates selected elements of an embodiment of a probability distribution diagram corresponding to the constellation diagram illustrated in FIG. 2A.

FIG. 2A illustrates selected elements of an embodiment of a constellation diagram 200 in the complex plane for 16-QAM. In constellation diagram 200, a 16-QAM constellation is shown having a uniform distribution of the 16 constellation points. In this example, for 16-QAM with a uniform distribution, there would be 16 different symbols, each having a probability of $\frac{1}{16}^{th}$. FIG. 2B illustrates selected elements of an embodiment of a probability distribution diagram 201 corresponding to the constellation diagram 200 illustrated in FIG. 2A. The height of each column represents a probability value for a symbol in a corresponding position in constellation diagram 200. In this example, the probability of each symbol assigned is $\frac{1}{16}$ or 0.0625. Plugging the probability P=$\frac{1}{16}$ into Equation 2 above, plugging M=16 into Equation 3 above, or plugging M=16 into Equation 4, as shown below, yields an entropy of four bits per symbol.

$$\log_2 16 = 4(\text{bits/symbol})$$

As will be described in further detail herein, methods and systems are disclosed for probabilistic constellation shaping using set-partitioned M-QAM in optical transport networks, such as optical transport network 101. Applying probabilistic shaping based on set-partitioned M-QAM may allow an optical transport network to achieve lower entropy for long distance transmission (e.g., entropy above 1 bit/symbol). More specifically, the use of probabilistic shaping based on set-partitioned M-QAM may enable optical transport network to achieve entropy between 1 and $\log_2(M)-1$ bits/symbol, where m is the size of M-QAM. This represents a significant technical improvement over conventional probability shaping for M-QAM, which achieves entropy between 2 and $\log_2(M)$ bits/symbol. In some embodiments the use of probabilistic shaping based on set-partitioned M-QAM may enable long distance transmission, such as over undersea cables, which may transmit the optical data with less spectral efficiency than that of QPSK. In some embodiments probabilistic shaping based on set-partitioned M-QAM may achieve a better approximated probabilistic profile than conventional probabilistic shaping for M-QAM for the same m value. In one example, with probabilistic shaping based on set-partitioned 16-QAM, the entropy may be controlled to be between 1 bit/symbol and 3 bits/symbol, which is an improvement of one bit compared to the entropy calculated above for PS-16-QAM without set partitioning.

Figure 3:
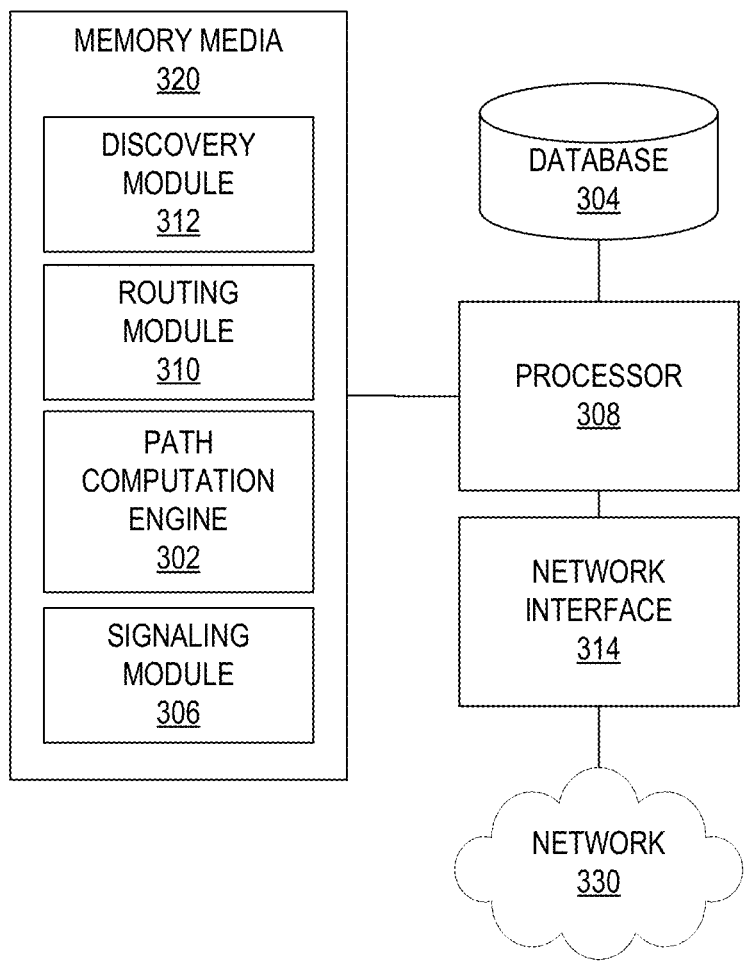
FIG. 3 is a block diagram of selected elements of an embodiment of network management system 300 for implementing control plane functionality in optical networks.

Referring now to FIG. 3, a block diagram of selected elements of an embodiment of network management system 300 for implementing control plane functionality in optical networks, such as, for example, in optical transport network 101 (see FIG. 1), is illustrated. A control plane may include functionality for network intelligence and control and may comprise applications that support the ability to establish network services, including applications or modules for discovery, routing, path computation, and signaling, as will be described in further detail. The control plane applications executed by network management system 300 may work together to automatically establish services within the optical network. Discovery module 312 may discover local links connecting to neighbors. Routing module 310 may broadcast local link information to optical network nodes while populating database 304. When a request for service from the optical network is received, path computation engine 302 may be called to compute a network path using database 304. This network path may then be provided to signaling module 306 to establish the requested service.

As shown in FIG. 3, network management system 300 includes processor 308 and memory media 320, which may store executable instructions (i.e., executable code) that may be executable by processor 308, which has access to memory media 320. Processor 308 may execute instructions that cause network management system 300 to perform the functions and operations described herein. For the purposes of this disclosure, memory media 320 may include non-transitory computer-readable media that stores data and instructions for at least a period of time. Memory media 320 may comprise persistent and volatile media, fixed and removable media, and magnetic and semiconductor media. Memory media 320 may include, without limitation, storage media such as a direct access storage device (e.g., a hard disk drive or floppy disk), a sequential access storage device (e.g., a tape disk drive), compact disk (CD), random access memory (RAM), read-only memory (ROM), CD-ROM, digital versatile disc (DVD), electrically erasable programmable read-only memory (EEPROM), and flash memory; non-transitory media, or various combinations of the foregoing. Memory media 320 is operable to store instructions, data, or both. Memory media 320 as shown includes sets or sequences of instructions that may represent executable computer programs, namely, path computation engine 302, signaling module 306, discovery module 312 and routing module 310.

Also shown included with network management system 300 in FIG. 3 is network interface 314, which may be a suitable system, apparatus, or device operable to serve as an interface between processor 308 and network 330. Network interface 314 may enable network management system 300 to communicate over network 330 using a suitable transmission protocol or standard. In some embodiments, network interface 314 may be communicatively coupled via network 330 to a network storage resource. In some embodiments, network 330 represents at least certain portions of optical transport network 101. In certain embodiments, network 330 may include at least certain portions of a public network, such as the Internet. Network 330 may be implemented using hardware, software, or various combinations thereof.

In certain embodiments, the control plane may be configured to interface with a person (i.e., a user) and receive data about the signal transmission path. For example, the control plane may also include and/or may be coupled to one or more input devices or output devices to facilitate receiving data about the signal transmission path from the user and outputting results to the user. The one or more input and output devices (not shown) may include, but are not limited to, a keyboard, a mouse, a touchpad, a microphone, a display, a touchscreen display, an audio speaker, or the like. Alternately or additionally, the control plane may be configured to receive data about the signal transmission path from a device such as another computing device or a network element (not shown in FIG. 3), for example via network 330.

As shown in FIG. 3, in some embodiments, discovery module 312 may be configured to receive data concerning an optical signal transmission path in an optical network and may be responsible for discovery of neighbors and links between neighbors. In other words, discovery module 312 may send discovery messages according to a discovery protocol, and may receive data about the optical signal transmission path. In some embodiments, discovery module 312 may determine features, such as, but not limited to: fiber type, fiber length, number and type of components, data rate, modulation format of the data, input power of the optical signal, number of signal carrying wavelengths (i.e., channels), channel spacing, traffic demand, and network topology, among others.

As shown in FIG. 3, routing module 310 may be responsible for propagating link connectivity information to various nodes within an optical network, such as optical transport network 101. In particular embodiments, routing module 310 may populate database 304 with resource information to support traffic engineering, which may include link bandwidth availability. Accordingly, database 304 may be populated by routing module 310 with information usable to determine a network topology of an optical network.

Path computation engine 302 may be configured to use the information provided by routing module 310 to database 304 to determine transmission characteristics of the optical signal transmission path. The transmission characteristics of the optical signal transmission path may provide insight on how transmission degradation factors, such as chromatic dispersion (CD), nonlinear (NL) effects, polarization effects, such as polarization mode dispersion (PMD) and polarization dependent loss (PDL), and amplified spontaneous emission (ASE), among others, may affect optical signals within the optical signal transmission path. To determine the transmission characteristics of the optical signal transmission path, path computation engine 302 may consider the interplay between the transmission degradation factors. In various embodiments, path computation engine 302 may generate values for specific transmission degradation factors. Path computation engine 302 may further store data describing the optical signal transmission path in database 304.

In FIG. 3, signaling module 306 may provide functionality associated with setting up, modifying, and tearing down end-to-end networks services in optical transport network 101. For example, when an ingress node in the optical network receives a service request, the control plane may employ signaling module 306 to request a network path from path computation engine 302 that may be optimized according to different criteria, such as bandwidth, cost, etc. When the desired network path is identified, signaling module 306 may then communicate with respective nodes along the network path to establish the requested network services. In different embodiments, signaling module 306 may employ a signaling protocol to propagate subsequent communication to and from nodes along the network path.

In operation of network management system 300, path computation engine 302, or another entity or module, may provide path information associated with a given optical path, such as a distance, a number and type of optical channels to be transmitted, a fiber type, and a dispersion map. For example, signaling module 306, or another entity or module, may receive the path information and may decide on a type of modulation format and whether or not to use constellation shaping (and, if so, whether or not to apply set partitioning and shaping parameters) for any of the optical channels transmitted over the optical path. In order to activate or deactivate constellation shaping, with or without set partitioning, signaling module 306 may send a first command to each transmitter for each of the optical channels, respectively. Then, signaling module 306 may send a second command to each receiver corresponding to each transmitter to activate or deactivate constellation shaping. Transmitters and receivers having universal programmable transponder functionality may receive the commands from signaling module 306 and may then activate or deactivate transmission of the optical channels using constellation shaping.

Figure 4:
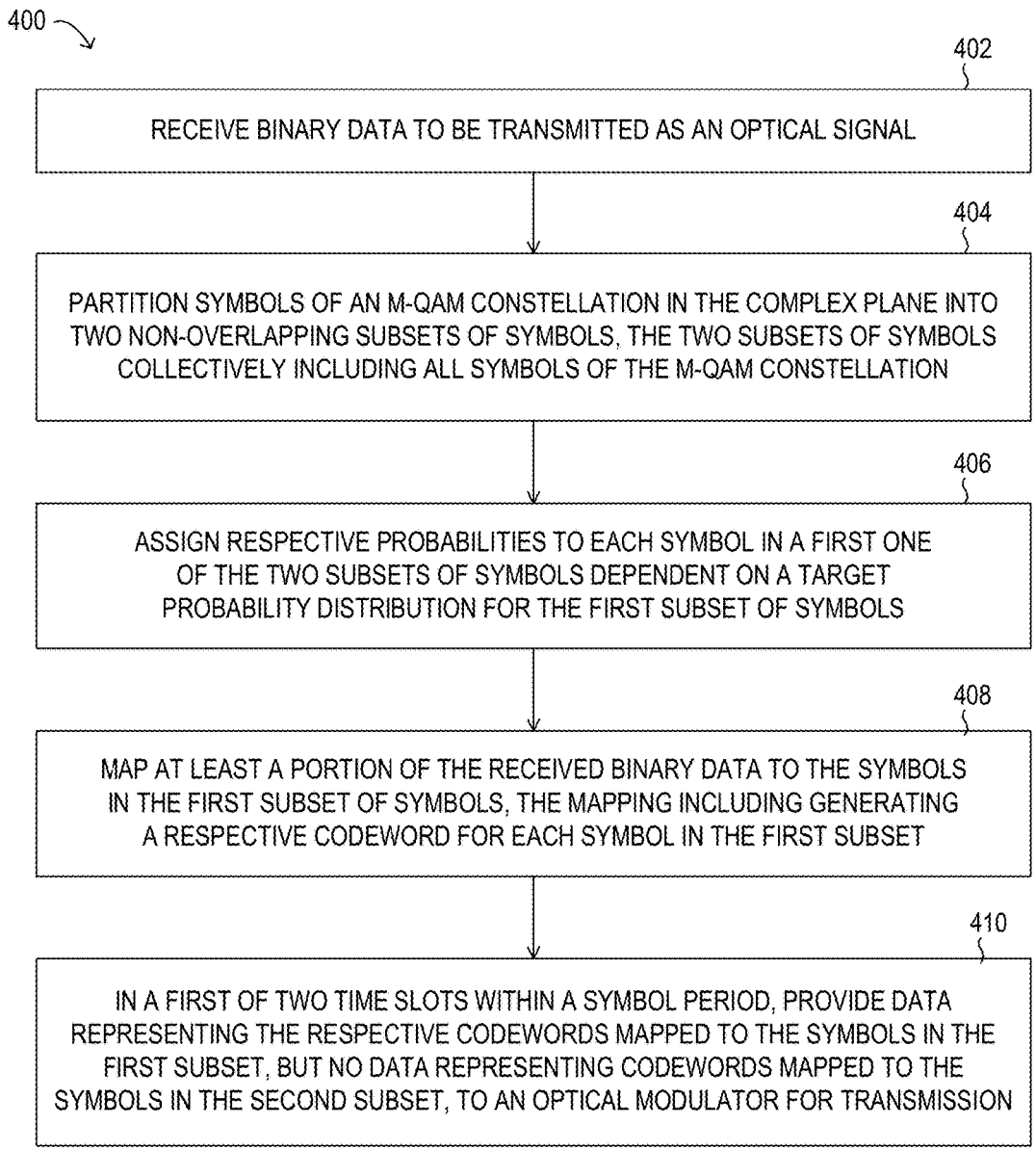
FIG. 4 is a block diagram of selected elements of an embodiment of method for probabilistic constellation shaping using set-partitioned M-QAM depicted in flowchart form.

Referring now to FIG. 4, a block diagram of selected elements of an embodiment of method 400 for probabilistic constellation shaping using set-partitioned M-QAM, as described herein, is depicted in flowchart form. Method 400 may be performed using optical transport network 101. In some embodiments, network management system 300 illustrated in FIG. 3 may be used to obtain path information as well as send commands to optical transmitters and optical receivers to configured them for probabilistic constellation shaping using set-partitioned M-QAM, as described above. Although method 400 is described in the singular in terms of an optical channel among a plurality of optical channels, it will be understood that operations in method 400 may be repeated or duplicated, either in parallel or in serial, for any plurality of optical channels. It is noted that certain operations described in method 400 may be optional or may be rearranged in different embodiments.

Method 400 may begin at 402 by receiving binary data to be transmitted as an optical signal. At 404, the method may include partitioning symbols of an M-QAM constellation in the complex plane into two non-overlapping subsets of symbols, the two subsets of symbols collectively including all symbols of the M-QAM constellation. In one example, the 16 symbols for 16-QAM may be partitioned into two subsets of symbols, each including eight symbols.

At 406, method 400 may include assigning respective probabilities to each symbol in a first one of the two subsets of symbols dependent on a target probability distribution for the first subset of symbols. At 408, the method may include mapping at least a portion of the received binary data to the symbols in the first subset of symbols, the mapping including generating a respective codeword for each symbol in the first subset. As described in more detail below, in some embodiments, a FEC encoding may also be applied during the mapping.

At 410, in a first of two alternating time slots (or symbol periods), method 400 may include providing data representing the respective codewords mapped to the symbols in the first subset to an optical modulator for transmission. However, regardless of whether any of the received binary data has been mapped to symbols in the second subset of symbols or whether respective codewords have been generated for any of the symbols in the second subset, no data representing codewords mapped to the symbols in the second subset is provided to the optical modulator for transmission during the first of the two alternating time slots.

Figure 5:
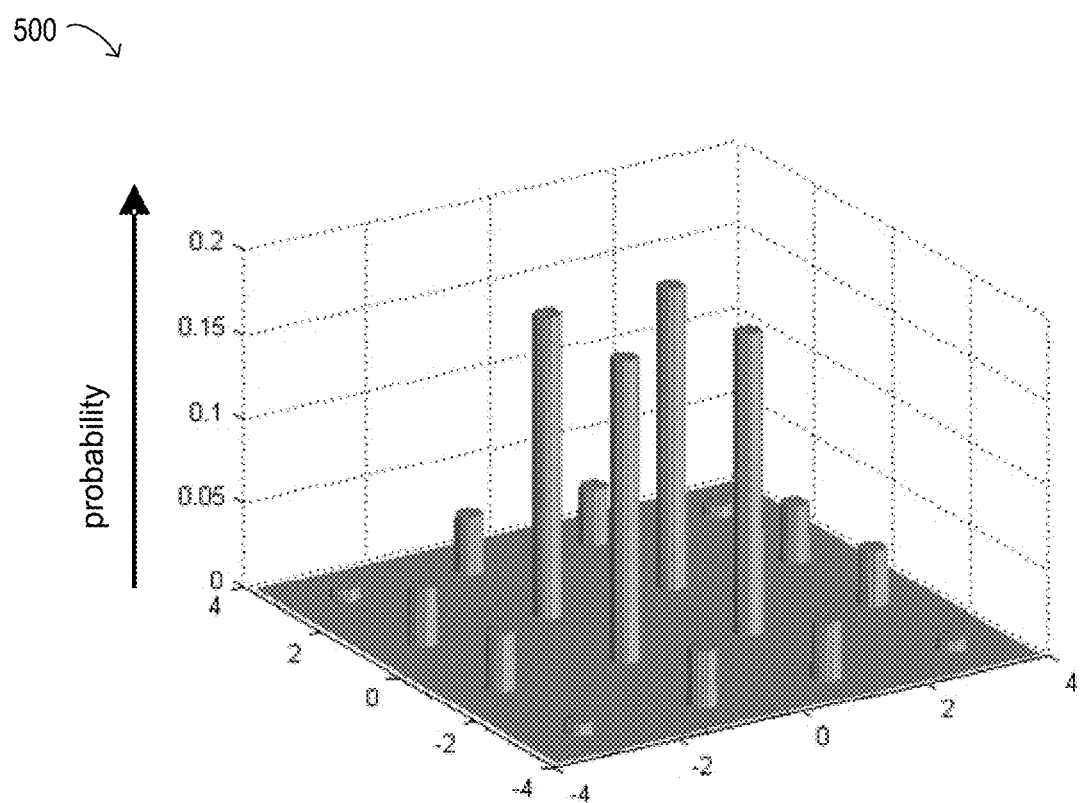
FIG. 5 illustrates selected elements of an embodiment of a probability distribution diagram for constellation points in a probabilistically shaped 16-QAM constellation.

Referring now to FIG. 5, selected elements of an embodiment of a probability distribution diagram 500 for constellation points in a probabilistically shaped 16-QAM constellation are shown. In probability distribution diagram 500, the probabilistically shaped 16-QAM constellation is shown having a non-uniform probability distribution of constellation points as an example of constellation shaping, as disclosed herein. The height of each column represents a probability value for a symbol in a corresponding position in a constellation diagram for 16-QAM.

As illustrated in FIG. 5, probabilistic shaping is circularly symmetric, with the probability being dependent on the energy of the symbol. For example, all symbols at a same first distance from the center of the constellation have the same probability. In the illustrated example, probabilistic shaping has been applied to the 16-QAM constellation to boost the relative probability of the four innermost symbols (when compared to a uniform distribution), and to decrease the probability of the other symbols. As a result of the shaping, eight symbols at a same second distance from the center of the constellation have the same energy and corresponding probability as each other, both of which are smaller than those of the four innermost symbols. The four outermost symbols at a same third distance from the center of the constellation (shown in FIG. 5 as the corner symbols in probability distribution diagram 500) have the same energy and corresponding probability as each other, and that probability is the smallest of those for the symbols in the constellation.

In an extreme case of probabilistic shaping for 16-QAM, the innermost four symbols might each have a probability of 0.25, and all other symbols might have a probability of zero. This extreme case represents the lowest possible entropy of 2 bits/symbol, which corresponds to a QPSK modulation format. In this case, as shown in the equations for calculating entropy above, the number of bits/symbol is smaller than that of uniform 16-QAM. Note, however, that in the example illustrated in FIG. 5, none of the symbols has a probability of zero. Therefore, the lowest possible entropy of 2 bits/symbol will not be achieved, in this example. Note that by controlling the probability, the actual data rate for transmitting the information encoded in an optical signal may also be controlled.

Figure 6:
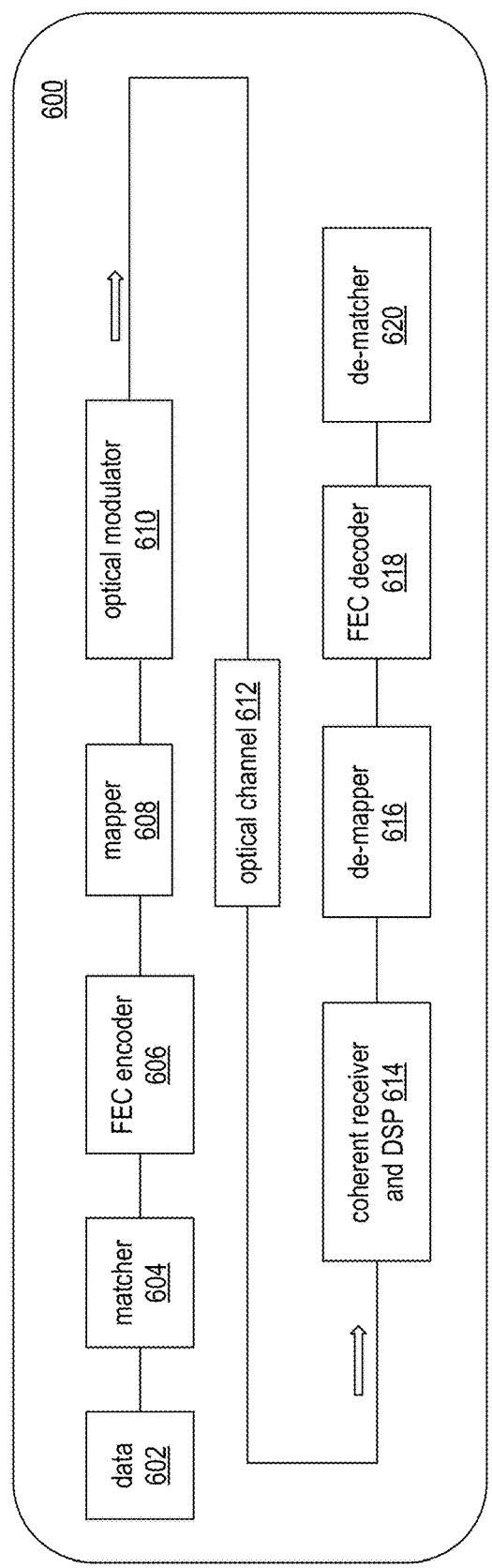
FIG. 6 is a schematic diagram illustrating selected elements of an example embodiment of an optical transmission system configured to apply probabilistic shaping to one or more WDM channels in an optical network.

FIG. 6 is a schematic diagram illustrating selected elements of an example embodiment of an optical transmission system 600 configured to apply probabilistic shaping to one or more WDM channels in an optical network. As illustrated in this example, in some embodiments transmission system 600 includes elements similar to those of a conventional transmitter/receiver including, on the transmitter side, binary data 602 that is provided to optical transmission system 600 for transmission, forward error correction (FEC) encoder 606, mapper 608, and optical modulator 610, an optical channel 612 comprising a suitable transmission media, and, on the receiver side, coherent receiver and DSP element 614, de-mapper 616, and FEC decoder 618.

In order to apply probabilistic shaping, transmission system 600 also includes matcher 604 on the transmitter side and de-matcher 620 on the receiver side. The matcher may ensure sure that the center constellation points have a higher probability of occurrence than the edge constellation points. For example, matcher 604 may be configured to control the probability of occurrence of certain constellation points on the transmitter side to shape the distribution of the constellation points, and de-matcher 620 may be configured to reverse the probabilistic shaping process.

In the illustrated embodiment, matcher 604 receives the binary data 602 and generates data that is modified to achieve a particular probability profile based, for example, on a target probability distribution. Following matcher 604, FEC encoder 606 and symbol mapper 608 may add forward error correcting encodings and map portions of binary data 602 (now with probabilities shaped by matcher 604) to respective symbols before providing outputs to optical modulator 610 for transmission over optical channel 612. In the illustrated embodiment, coherent receiver and DSP 614 may, using de-mapper 614, retrieve the modified and mapped portions of binary data 602 that were provided to optical modulator 610 and transmitted over optical channel 612. Subsequently, this binary data may be processed by FEC decoder 618 and de-matcher 620 to recover the originally received binary data 602.

In various embodiments, coherent receiver and DSP element 614 may include any or all of an I/Q imbalance compensation element, a chromatic dispersion compensation element, an adaptive equalizer, a polarization de-multiplexer, a frequency offset compensation element, a carrier phase recovery element, and/or a cycle slip compensation element.

In one example, probabilistic constellation shaping may be applied in a transponder configured to transmit an optical signal using 64 QAM. By apply probabilistic shaping, the spectral efficiency can vary from 64 QAM to QPSK (e.g., from 6 bits per symbol per polarization to 2 bits per symbol per polarization) with very fine tuning. In some embodiments, the spectral efficiency may be varied in increments of less than one bit per symbol. For example, instead of the spectral efficiency being configurable with values of just 6 or 5 bits per symbol, the spectral efficiency may be configurable with values of 5.1, 5.5, or 5.9 bits per symbol, as an example. In some embodiments, using matcher 604 and de-matcher 620, one transponder may be able to cover the whole range of spectral efficiency between 2 bits per symbol and 6 bits per symbol.

Figure 7A:
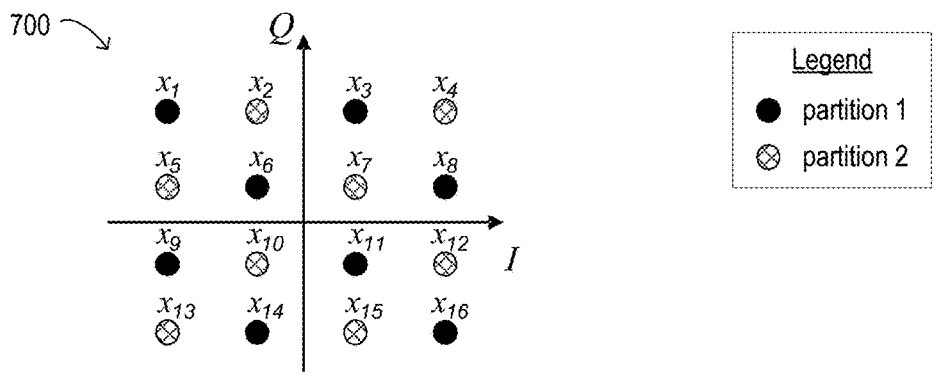
FIGS. 7A through 7D illustrate probabilistic constellation shaping with set partitioning for 16-QAM, according to some embodiments.

FIGS. 7A through 7D illustrate probabilistic constellation shaping with set partitioning for 16-QAM, according to some embodiments. In the illustrated example, the 16 symbols of M-QAM are partitioned into two different subsets. More specifically, FIG. 7A illustrates a representation of a constellation diagram 700 for 16-QAM in which elements $x_3, x_6, x_8, x_9, x_{11}, x_{14}$, and $x_{16}$ (shown as solid circles in FIG. 7A) represent constellation points in a first partition, $X_{partition1}$, and elements $x_2, x_4, x_5, x_7, x_{10}, x_{12}, x_{13}$, and $x_{15}$ (shown as hashed circles in FIG. 7A) represent constellation points in a second partition, $X_{partition2}$.

Figures 7B, 7C:
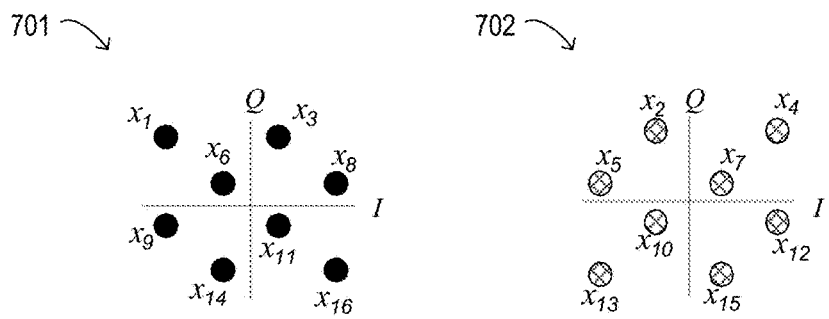

FIG. 7B illustrates a representation 701 of the constellation points in partition 1 of constellation 700 only and FIG. 7C illustrates a representation 702 of the constellation points in partition 2 of constellation 700 only. As illustrated in FIGS. 7B and 7C, the symbols in partition 1 are the mirror image of the symbols in partition 2 with respect to the I or Q axis in the complex plane. Therefore, for example, the probability of $x_1$ should be the same as the probability of $x_4$. As described herein, because only half of the constellation points will be used in probability shaping for the set-partitioned M-QAM in any given symbol period, the maximum entropy will be $\log_2(M/2)$ bits/symbol. For example, for PS-SP-16-QAM, the probability mass function may be as follows:

$$P(x_1)=P(x_2)=\cdots=P(x_{16})=\text{\textonesuperior/\textsubscript{8}}, \text{ normalized for each time slot.}$$

In this example, each time slot will have an entropy of 3 bits/symbol. As described herein, the minimum entropy may be 1 bit/symbol which corresponds to BPSK. In this case, only the two constellation points closest to the origin in partition 1 or 2 will have non-zero probabilities. For example, for the PS-SP-16-QAM constellation shown in FIG. 7A (where it is assumed that $x_6, x_{11}, x_7$, and $x_{10}$ have the lowest energy):

$$\text{if } i \in \{6,11,7,10\}, \text{then } P(x_1)=\text{\textonehalf}, \text{else } P(x_1)=0$$

Figure 7D:
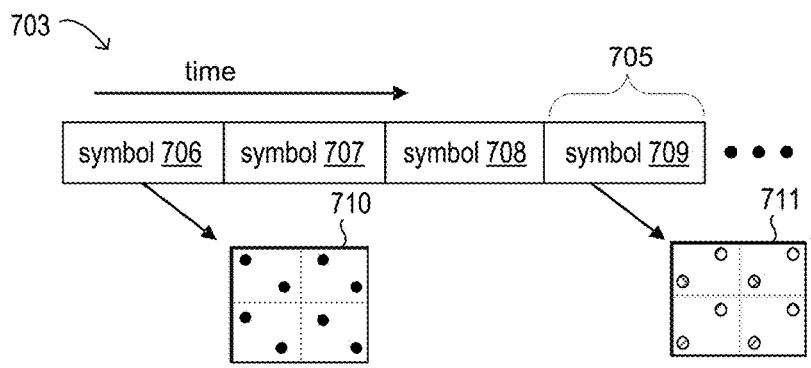

As described herein, at each time slot, data representing only half of the constellation points (e.g., those corresponding to partition 1 or those corresponding to partition 2, but not both) may be transmitted over the optical channel. This is illustrated in FIG. 7D, according to one embodiment. In this example, four symbol periods are represented corresponding to alternating odd and even time slots, and the width of each symbol period (or time slot) is shown as 705. During the odd times slots, data associated with the symbols in partition 1 (shown as 710) is transmitted. In the illustrated example, this data includes data mapped to symbols 706, 708, and so on. During the even time slots, data associated with the symbols in partition 2 (shown as 711) is transmitted. In the illustrated example, this data includes data mapped to symbols 707, 709, and so on.

In various embodiments, different operations may be performed to implement probabilistic constellation shaping using set-partitioned M-QAM. In a first example embodiment, the operations may include, after partitioning the symbols into two sets, choosing one of the sets of partitioned symbols on which to operate, calculating a target probability distribution for the chosen symbol set, applying a matching function to generate codewords for the chosen symbol set, choosing either the even or odd time slots during which to transmit data mapped to the symbols of the chosen symbol set, and re-mapping the data to the symbols of the unchosen symbol set, e.g., re-mapping them to the respective symbols corresponding to the mirror images, with respect to the I or the Q axis in the complex plane, of the symbols of the chosen symbol set for which they were generated. In some embodiments, the target probability distribution may be, or may be based on, a Maxwell-Boltzmann distribution for a given OSNR or for a targeted entropy and codeword size pair. In other embodiments, the target probability distribution may follow a different distribution profile.

FIG. 8A illustrates selected elements on the transmitter side of an optical path 800 for probabilistic shaping using set partitioned M-QAM (PS-SP-M-QAM), in accordance with the first example embodiment described above. In this example embodiment, the elements of the transmitter side of optical path 800 are similar to the elements of the transmitter side of optical transmission system 600 illustrated in FIG. 6 and described above. For example, the transmitter side of optical path 800 includes binary data 802 that is provided to optical path 800 for transmission, matcher 804, forward error correction (FEC) encoder 806, mapper 808, and optical modulator 812. In this example, the transmitter side of optical path 800 also includes symbol re-mapper 810, which is configured to re-map codewords generated for symbols in a first partitioned symbol set (e.g., for transmission during odd time slots) to corresponding symbols in a second partitioned symbol set (e.g., for transmission during even time slots). In at least some embodiments, at symbol re-mapper 810, codewords may be re-mapped to symbols that are mirror images of the symbols for which they were generated with respect to the I or the Q axis in the complex plane.

FIG. 8B illustrates an example probability distribution diagram 820 for the constellation points of a first partition of symbols for M-QAM as partitioned by matcher 804, according to some embodiments. After re-mapping the codewords generated for symbols in the first partition to corresponding symbols in the second partition, a probability distribution diagram for the constellation points of the second partition of symbols for M-QAM may appear as the mirror image of probability distribution diagram 820 (not shown in the figures). The combined distribution of symbols for the odd and even time slots is illustrated in FIG. 8C, according to some embodiments.

In a second example embodiment, the operations performed to implement probabilistic constellation shaping using set-partitioned M-QAM may include, after partitioning the symbols into two sets, choosing one partition to be processed by respective elements of a first processing path and choosing the other partition to be processed by respective elements of a second processing path, splitting the incoming data into two streams by interleaving the data and directing each stream (corresponding to one of the partitions) to a respective matcher in the chosen one of the two processing paths for parallel processing, calculating (for each stream) a target probability distribution for the corresponding partition, applying respective matching functions to the streams to generate codewords for the symbols of the corresponding partition, and combining the outputs of the two processing paths, including the codewords, in odd and even time slots by de-interleaving the data associated with the two partitions for transmission in alternating time slots. In some embodiments, the target probability distribution may be, or may be based on, a Maxwell-Boltzmann distribution for a given OSNR or for a targeted entropy and codeword size pair. In other embodiments, the target probability distribution may follow a different distribution profile.

FIGS. 9A through 9D illustrate the use of parallel processing for probabilistic shaping using set partitioned M-QAM on the transmitter side of an optical path, according to some embodiments. More specifically, FIG. 9A illustrates selected elements on the transmitter side of an optical path 900 for probabilistic shaping using set partitioned M-QAM (PS-SP-M-QAM), in accordance with the second example embodiment described above.

In this example embodiment, at least some of the elements of the transmitter side of optical path 900 are similar to the elements of the transmitter side of optical transmission system 600 illustrated in FIG. 6 and described above. In the illustrated embodiment, the transmitter side of optical path 900 includes binary data 902 that is provided to optical path 900 for transmission. Interleaver 903 splits incoming binary data 902 into two streams, each directed to a respective processing path for processing in parallel. Each processing path including a respective matcher 904, FEC encoder 906, and symbol mapper 908. In this example, outputs of the two symbol mappers 908 are combined by de-interleaver 909 and the combined output is provided to optical modulator 910 for transmission in alternating odd and even time slots.

In the illustrated example, the upper processing path may process data for the odd time slots using partition 1 of the constellation and the lower processing path may process data for the even time slots using partition 2 of the constellation.

FIG. 9B illustrates an example probability distribution diagram 930 for the constellation points of a first partition of symbols for M-QAM as partitioned by matcher 904-1. Similarly, FIG. 9C illustrates an example probability distribution diagram 940 for the constellation points of a second partition of symbols for M-QAM as partitioned by matcher 904-2. The combined distribution of symbols for the odd and even time slots, as output by de-interleaver 909, is illustrated in FIG. 9D, according to some embodiments.

In at least some embodiments, the application of PS-SP-16-QAM may yield more densely packed constellation points than the application of PS-M-QAM without set partitioning for the same normalized power. For example, the distance between the closest symbols may be same in both cases, although only half of the symbols are considered in either the odd time slots or the even time slots in PS-SP-16-QAM. Thus, a finer profile may be achievable using PS-SP-M-QAM rather than PS-M-QAM without set partitioning.

Figure 10A:
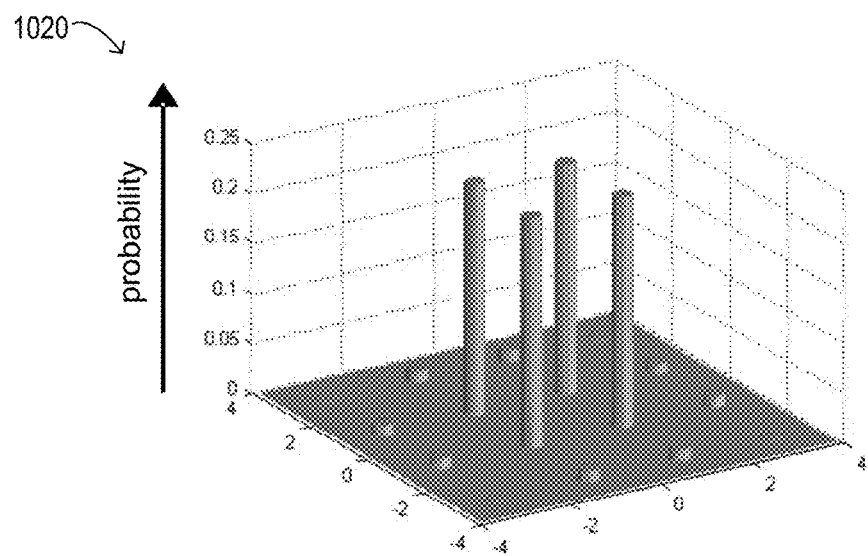
FIGS. 10A and 10B illustrate example probability distribution diagrams for probabilistically shaped M-QAM without set partitioning and with set partitioning, respectively.
Figure 10B:
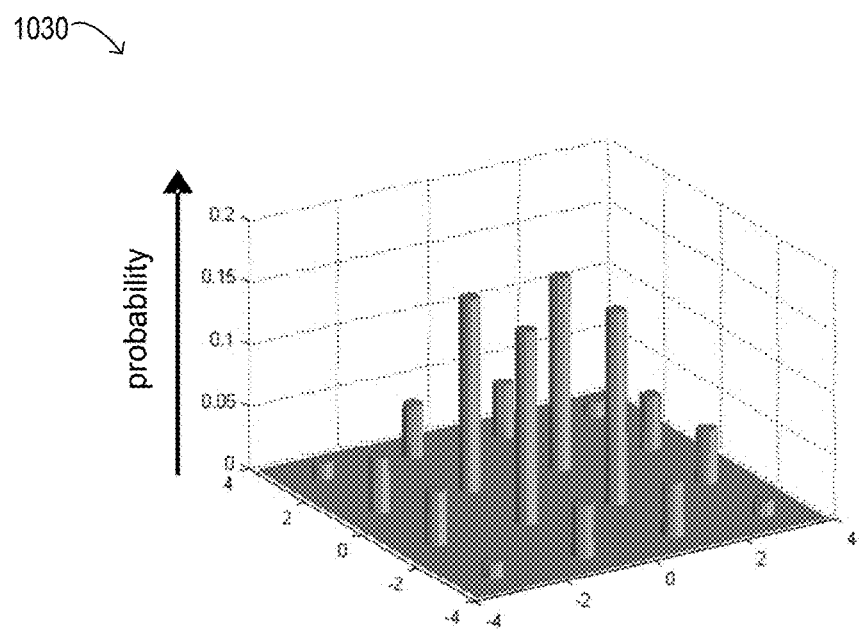

FIGS. 10A and 10B illustrate example probability distribution diagrams for probabilistically shaped M-QAM targeting an entropy of 2.5 bits/symbol without set partitioning and with set partitioning, respectively. More specifically, FIG. 10A illustrates a probability distribution diagram 1020 depicting a result of applying extreme probabilistic shaping using PS-16-QAM with a uniform distribution and without set partitioning. In this case, the resulting entropy is 2.5 bits/symbol. FIG. 10B illustrates a probability distribution diagram 1030 depicting a result of applying PS-SP-16-QAM (e.g., with set partitioning). In this case, the resulting entropy is also 2.5 bits/symbol. In this example, because the distance between the closest symbols is same in both cases, leading to the same signal-to-noise ratio, the performance may be expected to be the same. However, because more symbols are represented in the case of PS-SP-16-QAM, as shown in FIG. 10B, the transmitted signal may more accurately represent the input binary data.

In at least some embodiments, because PS-SP-M-QAM has even and odd time slots for two partitioned symbol sets, it may be possible to find mapping in which there is only one bit difference between the closest symbols in the constellation in each of the time slots. For example, while m bits are used to map a symbol, there are only m/2 symbols in each time slot. In at least some embodiments, the same codeword may be used in each time slot for a different symbol mapping.

Figure 11A:
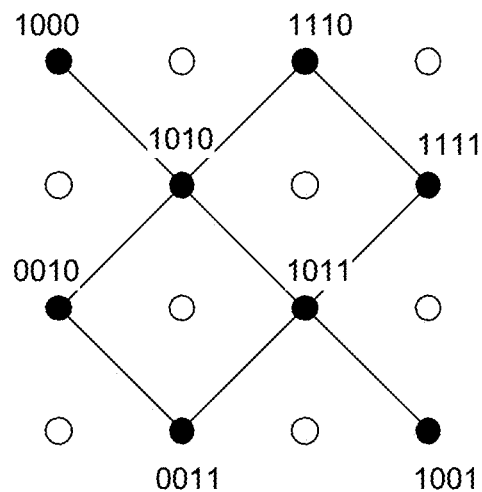
FIGS. 11A and 11B illustrate an example symbol mapping for PS-SP-16-QAM, according to some embodiments.
Figure 11B:
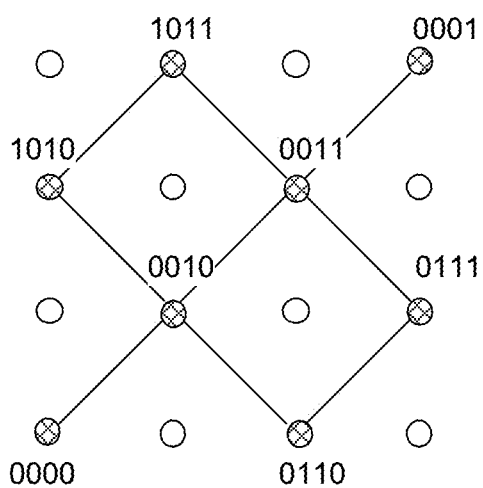

FIGS. 11A and 11B illustrate an example symbol mapping for PS-SP-16-QAM. More specifically, FIG. 11A illustrates a representation of a constellation diagram 1120 in which constellation points of partition 1 (shown as solid circles) are assigned code words for transmission during odd time slots. The remaining constellation points (shown as open circles) are unselected and may be ignored during the processing of data for the odd time slots. For example, probabilities may be defined by the matcher for the constellation points of partition 1, but the probabilities for the other constellation points (those in partition 2) may be set to zero.

FIG. 11B illustrates a representation of a constellation diagram 1130 in which constellation points of partition 2 (shown as hashed circles) are assigned code words for transmission during even time slots. The remaining constellation points (shown as open circles) are unselected and may be ignored during the processing of data for the even time slots. For example, probabilities may be defined by the matcher for the constellation points of partition 2, but the probabilities for the other constellation points (those in partition 1) may be set to zero. As noted above, at least some codewords may be used in both partitions for different symbols. In that case, the duplicated codewords may be distinguished from each other based on the time slots during which they are transmitted.

Figure 12A:
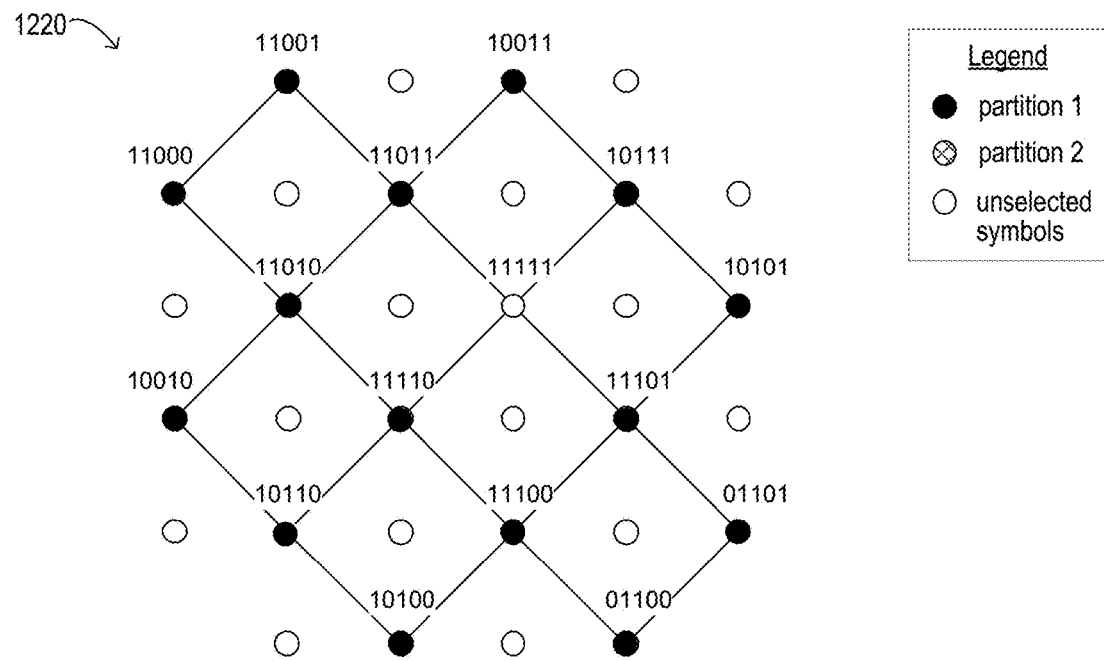
FIGS. 12A and 12B illustrate an example symbol mapping for PS-SP-32-QAM, according to some embodiments.
Figure 12B:
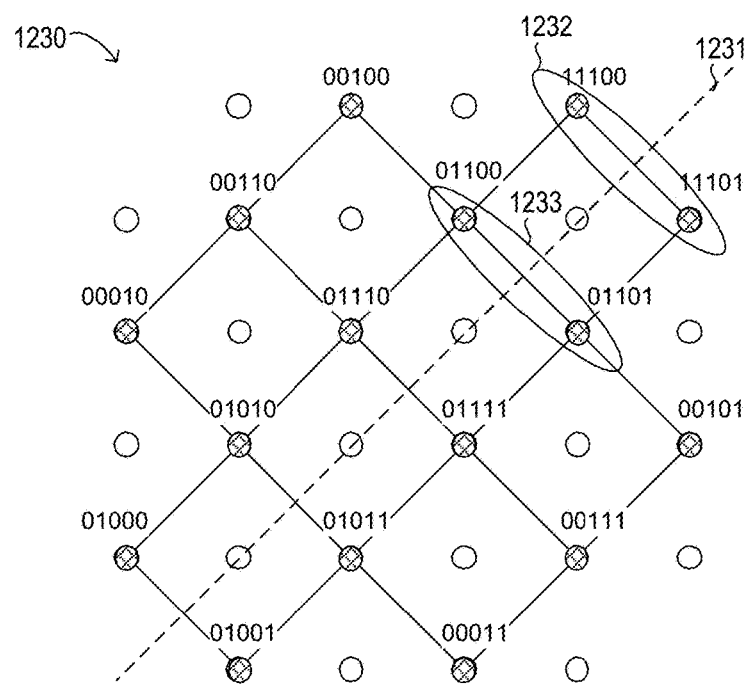

FIGS. 12A and 12B illustrate an example symbol mapping for PS-SP-32-QAM. More specifically, FIG. 12A illustrates a representation of a constellation diagram 1220 in which constellation points of partition 1 (shown as solid circles) are assigned code words for transmission during odd time slots. The remaining constellation points (shown as open circles) are unselected and may be ignored during the processing of data for the odd time slots. For example, probabilities may be defined by the matcher for the constellation points of partition 1, but the probabilities for the other constellation points (those in partition 2) may be set to zero. As illustrated in FIG. 12A, the matcher may create a respective codeword for each of the constellation points of partition 1 and the probability of occurrence of this codeword may be defined by the probability of the corresponding symbol.

FIG. 12B illustrates a representation of a constellation diagram 1230 in which constellation points of partition 2 (shown as hashed circles) are assigned code words for transmission during even time slots. The remaining constellation points (shown as open circles) are unselected and may be ignored during the processing of data for the even time slots. For example, probabilities may be defined by the matcher for the constellation points of partition 2, but the probabilities for the other constellation points (those in partition 1) may be set to zero.

FIGS. 12A and 12B illustrate the use of a type of Gray like symbol mapping in which the constituent bits of the codewords of neighboring symbols in one of the partitions (e.g., those to be transmitted during odd time slots or those to be transmitted during even timeslots), have the same values for all but one bit (in this case, the least significant bit). The use of Gray like mapping may provide benefits in the optical transport network due to the fact that, if there is a symbol error, the symbol error is most likely to occur between neighboring symbol. In this case, when a symbol error occurs, the error may be a one-bit error. While FIGS. 12A and 12B illustrate a type of Gray like mapping, this is just one example of a type of mapping that is suitable for assigning codewords (binary codes) to respective symbols. In some embodiments, a different symbol mapping technique may be applied to the codewords to be transmitted during odd time slots than the symbol mapping technique applied to the codewords to be transmitted during even time slots.

In at least some embodiments, the FEC encoders in the optical transmission systems described herein may implement systematic forward error correction. Systematic FEC may be applied without changing the distribution of constellation points by taking advantage of the symmetry of the partitioned constellation. Systematic FEC may be used to generate the least significant bit for FEC encoding, which will determine on which side of a symmetry line a particular constellation point lies. For example, for 50% of the symbols, the least significant bit will be assigned as '1' and for the other 50% of the symbols, the least significant bit will be assigned as '0'. The use of systematic FEC does not alter the upper (m−1) codeword bits generated by the matcher. For example, for the following partitions:

$X_{partition2}\{x_2, x_4, \ldots, x_{31}\}$ $X'_{partition2} = \{x'_2, x'_4, \ldots, x'_{31}\}$, label $b(x'_2) = 0010$, $b(x'_4) = 1110, \ldots$ and the following probability mass function:

$= P(x'_2) = P(x_2), \ldots, P(x'_{31}) = P(x_{31})$ and based on the target distribution, the matcher may generate shaped data based on the following:

$X'_{partition2} = \{x'_2, x'_4, \ldots, x'_{31}\}$ and $P(X'_{partition2})$

The result may then be encoded with systematic FEC, as follows:

$x_i = [x'_k | P]$ where $P$ is the added bit by FEC $k=2$: If $P=0$, then $i=2$. If $P=1$, then $i=22$;
[0010|0]=>00100

$k=4$: If $P=0$, then $i=4$. If $P=1$, then $i=10$;
[0010|1]=>00101

FIG. 12B illustrates a symmetry line 1231. In this example, the distribution of the constellation points is symmetric about symmetry line 1231. In this example, the codewords are mapped to symbols on one side of symmetry line 1231 if the least significant bit is zero and are mapped to the symbols on the other side of symmetry line 1231 if the significant bit is one. As noted above, the upper (m−1) bits of the symbols for M-QAM, along with the target distribution, are generated in the matcher. In the illustrated example, the four highest order bits in each codeword are generated by the matcher. The least significant bit is added by the FEC encoder and indicates on which side of the symmetry line the symbol lies. In at least some embodiments, neighboring symbols on opposite sides of symmetry line 1231 may have the same probability.

Referring again to FIG. 8A, for example, when binary data 802 comes in, matcher 804 creates codewords for only half of symbols in the constellation points of one of the partitions (e.g., for one of the two symbol sets into which the symbols are partitioned). Subsequently, using FEC encoder 806, with 50% probability, the least significant bit may be set to either zero or one. These operations yield a probabilistically shaped constellation. Next, re-mapper 810 may re-map symbols for even or odd timeslots to create a symmetric symbol pattern. This approach may result in neighboring symbols in a pair of symbols that are on opposite sides of symmetry line 1231 having codewords containing the same constituent bit values except for their least significant bits, which were added by the FEC encoder. In the example illustrated in FIG. 12B, a symmetric pair of codewords for neighboring symbols (including codewords 11100 and 11101) is shown as pair 1232. In another example, a symmetric pair of codewords for neighboring symbols (including codewords 01100 and 01101) is shown as pair 1233. Other symmetric pairs include codewords 00100 and 00101, and codewords 00110 and 00111.

Figure 13B:
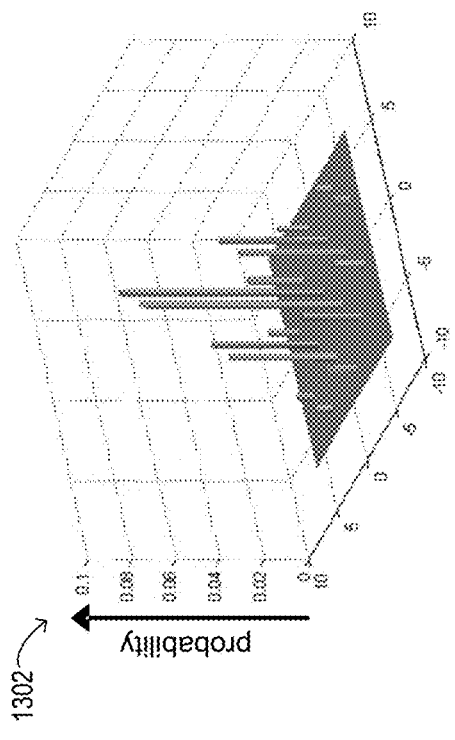
FIGS. 13A through 13C illustrate example probability distribution diagrams for PS-SP-32-QAM, according to some embodiments.
Figure 13C:
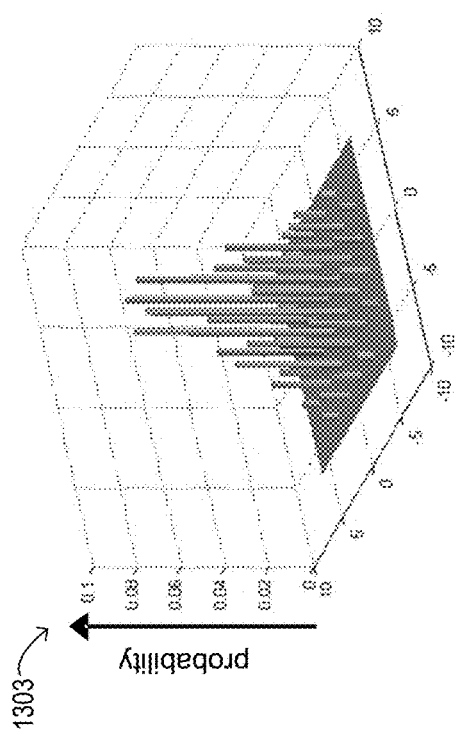
Figure 13A:
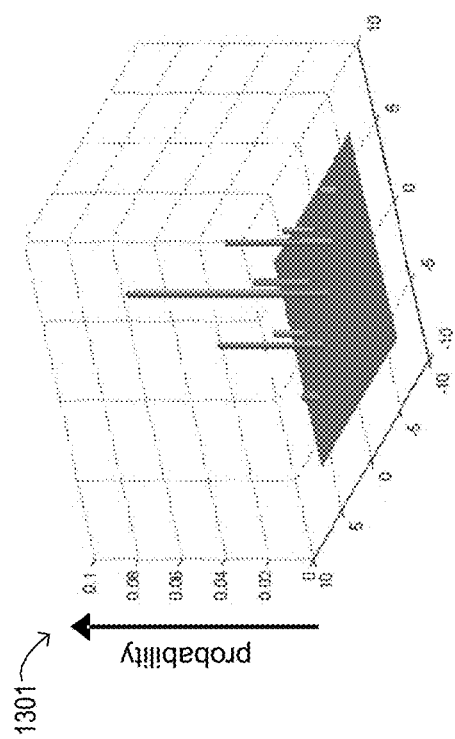

FIGS. 13A through 13C illustrate example probability distribution diagrams for PS-SP-32-QAM, according to some embodiments. More specifically, FIG. 13A illustrates a probability distribution diagram 1301 for half of the constellation points of a first partition following probabilistic constellation shaping by a matcher 804. FIG. 13B illustrates a probability distribution diagram 1302 following duplication of the generated codewords and the addition of an additional bit (either zero or one) to the codewords in each pair of duplicated codewords by FEC encoder 806. FIG. 13C illustrates a probability distribution diagram 1303 following symbol re-mapping by a re-mapper 810 to fill in the 32-element probability distribution diagram with symmetric codewords for the second partition.

In at least some embodiments, demodulation of the optical signals generated and transmitted using PS-SP-M-QAM may be achieved by reversing the process that was performed on the transmitter side of the optical path.

Figures 14A, 14B:
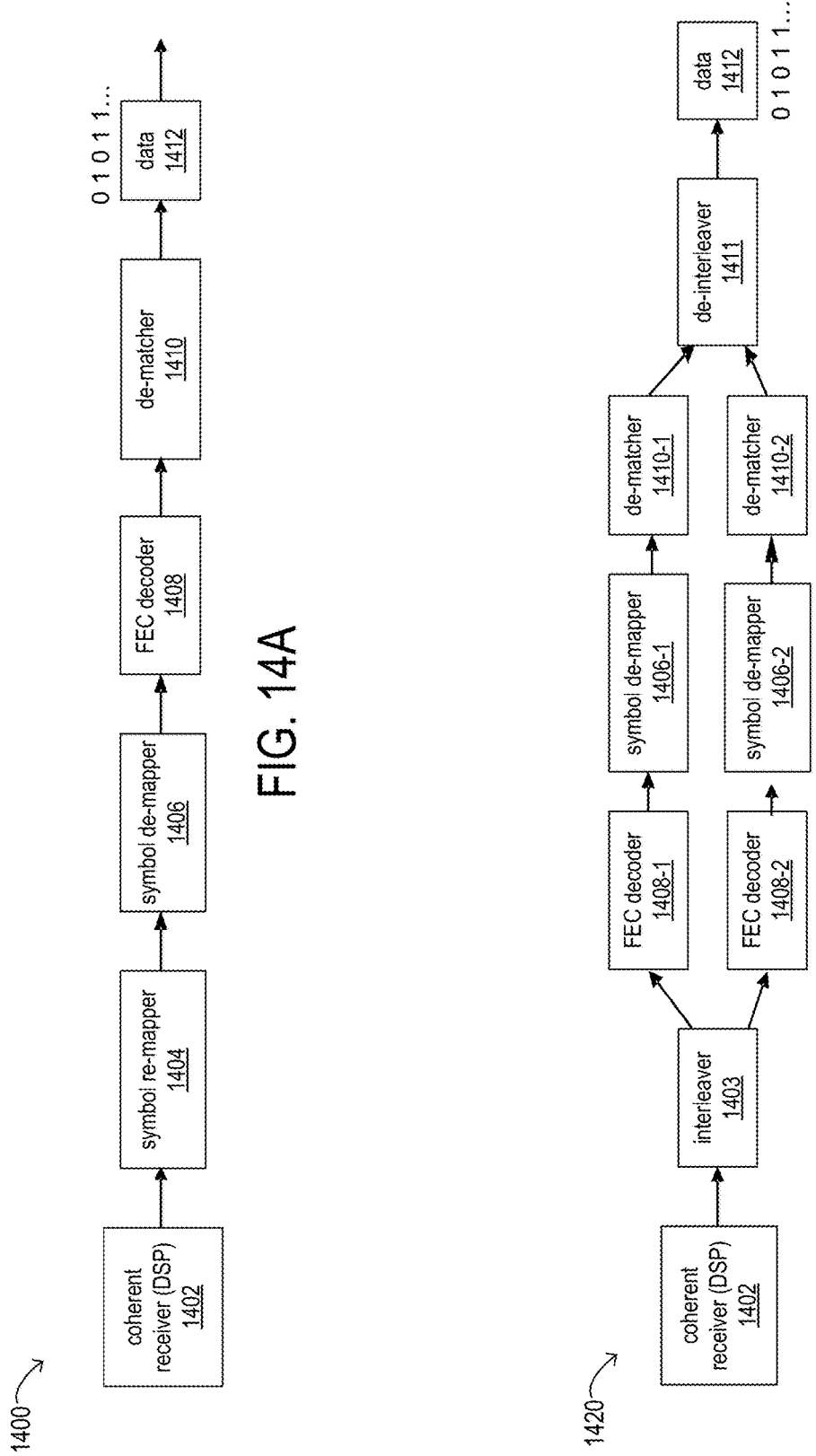
FIGS. 14A and 14B illustrate selected elements of respective embodiments of the receiver side of an optical path for PS-SP-M-QAM.

For example, FIG. 14A illustrates selected elements on the receiver side of an optical path 1400 for probabilistic shaping using set partitioned M-QAM (PS-SP-M-QAM), in accordance with the first example embodiment described above. In this example embodiment, the elements of the receiver side of the optical path are similar to those illustrated in FIG. 6 and described above. For example, the receiver side of optical path 1400 includes, among other elements, coherent receiver and DSP element 1402, symbol de-mapper 1406, FEC decoder 1408, and de-matcher 1410. In this example, the receiver side of optical path 1400 also includes symbol re-mapper 1404, at which symbols are mirrored with respect to the I axis or the Q axis in the complex plane. For example, the incoming information received at coherent receiver and DSP element 1402 may include the combined signals received during odd and even time slots, and may be separated and re-mapped (at 1404) into its constituent partitions. Subsequently, the symbols may be de-mapped (at 1406) and the results decoded (at 1408). Finally, the matching process may be reversed (at 1410). In this example, by reversing the processes of the transmitter side of optical path 1400, the originally received binary data may be recovered as data 1412.

FIG. 14B illustrates selected elements on the receiver side of an optical path 1420 for probabilistic shaping using set partitioned M-QAM (PS-SP-M-QAM), in accordance with the second example embodiment described above. Optical path 1420 includes parallel processing paths, each of which is used to process information for a respective one of two partitions created in matchers on the transmitter side of optical path 1420. In this example embodiment, the elements of the receiver side of the optical path are similar to those illustrated in FIG. 6 and described above. For example, the receiver side of optical path 1420 includes, among other elements, coherent receiver and DSP element 1402, interleaver 1403, de-interleaver 1441, and (for each parallel processing path) a respective FEC decoder 1408, symbol de-mapper 1406, and de-matcher 1410. In this example, the incoming information received at coherent receiver and DSP element 1402 may be split into two streams (corresponding to the odd and even time slots) by interleaver 903, and each stream may be directed to a respective processing path. Following processing of the two streams by respective FEC decoders 1408, symbol de-mappers 1406, and de-matchers 1410, the outputs of the two de-matchers 1410 are combined by de-interleaver 1411 to recover the originally received binary data as data 1412. In the illustrated example, the upper processing path may process data for the odd time slots using partition 1 of the constellation and the lower processing path may process data for the even time slots using partition 2 of the constellation.

Figure 15A:
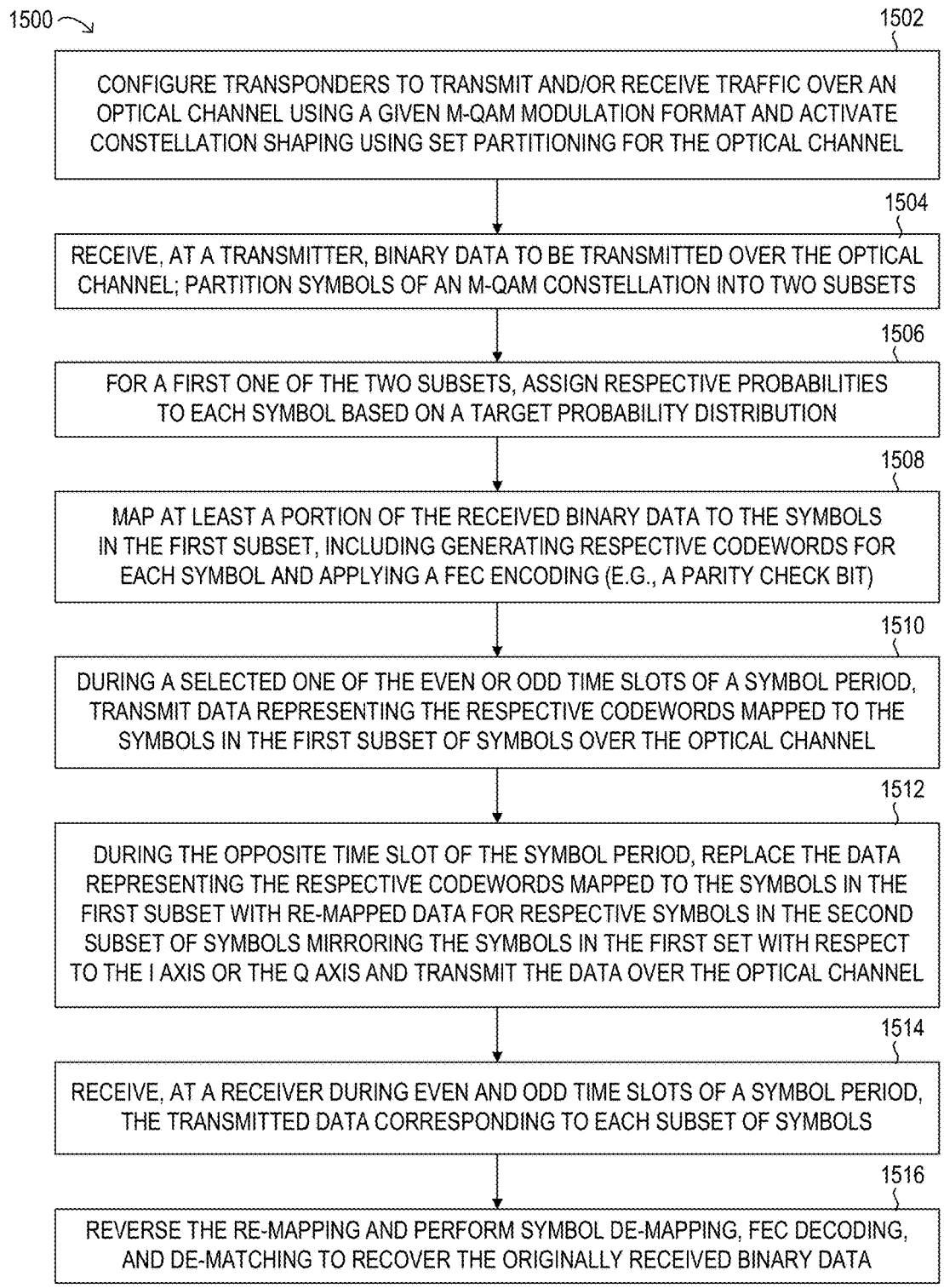
FIGS. 15A and 15B are block diagrams of selected elements of embodiments of respective methods for probabilistic constellation shaping using set-partitioned M-QAM depicted in flowchart form.

Referring now to FIG. 15A, a block diagram of selected elements of an embodiment of method 1500 for probabilistic constellation shaping using set-partitioned M-QAM, as described herein, is depicted in flowchart form. Method 1500 may be performed using optical transport network 101. More specifically, method 1500 may be performed by elements of an optical transport network such as those illustrated in FIG. 8A (on the transmitter side of a given optical path) and FIG. 14A (on the receiver side of the given optical path). Although method 1500 is described in the singular in terms of an optical channel among a plurality of optical channels, it will be understood that operations in method 1500 may be repeated or duplicated, either in parallel or in serial, for any plurality of optical channels. It is noted that certain operations described in method 1500 may be optional or may be rearranged in different embodiments.

Method 1500 may begin at 1502 by configuring one or more transponders to transmit and/or receive traffic over an optical channel using a given M-QAM modulation format and to activate constellation shaping using set partitioning for the optical channel. For example, in some embodiments, network management system 300 illustrated in FIG. 3 may be used to obtain path information as well as send commands to optical transmitters and optical receivers to configured them for probabilistic constellation shaping using set-partitioned M-QAM, as described above.

At 1504, method 1500 may include receiving, at a transmitter, binary data to be transmitted over the optical channel and partitioning the symbols of an M-QAM constellation into two subsets of symbols. In one example, the 16 symbols for 16-QAM may be partitioned into two subsets of symbols, each including eight symbols. At 1506, the method may include, for a first one of the two subsets of symbols, assigning respective probabilities to each symbol based on a target probability distribution.

At 1508, method 1500 may include mapping at least a portion of the received binary data to the symbols in the first subset of symbols, which may include generating respective codewords for each symbol and applying an FEC encoding. In at least some embodiments, the FEC encoding may include the addition of a bit in the least significant position, such as a parity check bit. In at least some embodiments, the codewords for neighboring pairs of symbols in the first subset may include the same values for the highest m−1 bits, and a different value for the least significant bit indicating on which side of a line of symmetry the corresponding symbol lies.

At 1510, the method may include, during a selected one of the even or odd time slots of a symbol period, transmitting data representing the respective codewords mapped to the symbols in the first subset of symbols over the optical channel. At 1512, method 1500 may include, during the opposite time slot of the symbol period, replacing the data representing the respective codewords mapped to the symbols in the first subset with re-mapped data for respective symbols in the second subset of symbols mirroring the symbols in the first set with respect to the I axis or the Q axis and transmitting the data over the optical channel.

At 1514, method 1500 may include receiving, at a receiver during even and odd time slots of a symbol period, the transmitted data corresponding to each subset of symbols. At 1516, the method may include reverse the re-mapping and performing symbol de-mapping, FEC decoding, and de-matching to recover the originally received binary data.

In at least some embodiments, the operations shown as 1504 through 1516 may be repeated as more data is received at the transmitter.

Figure 15B:
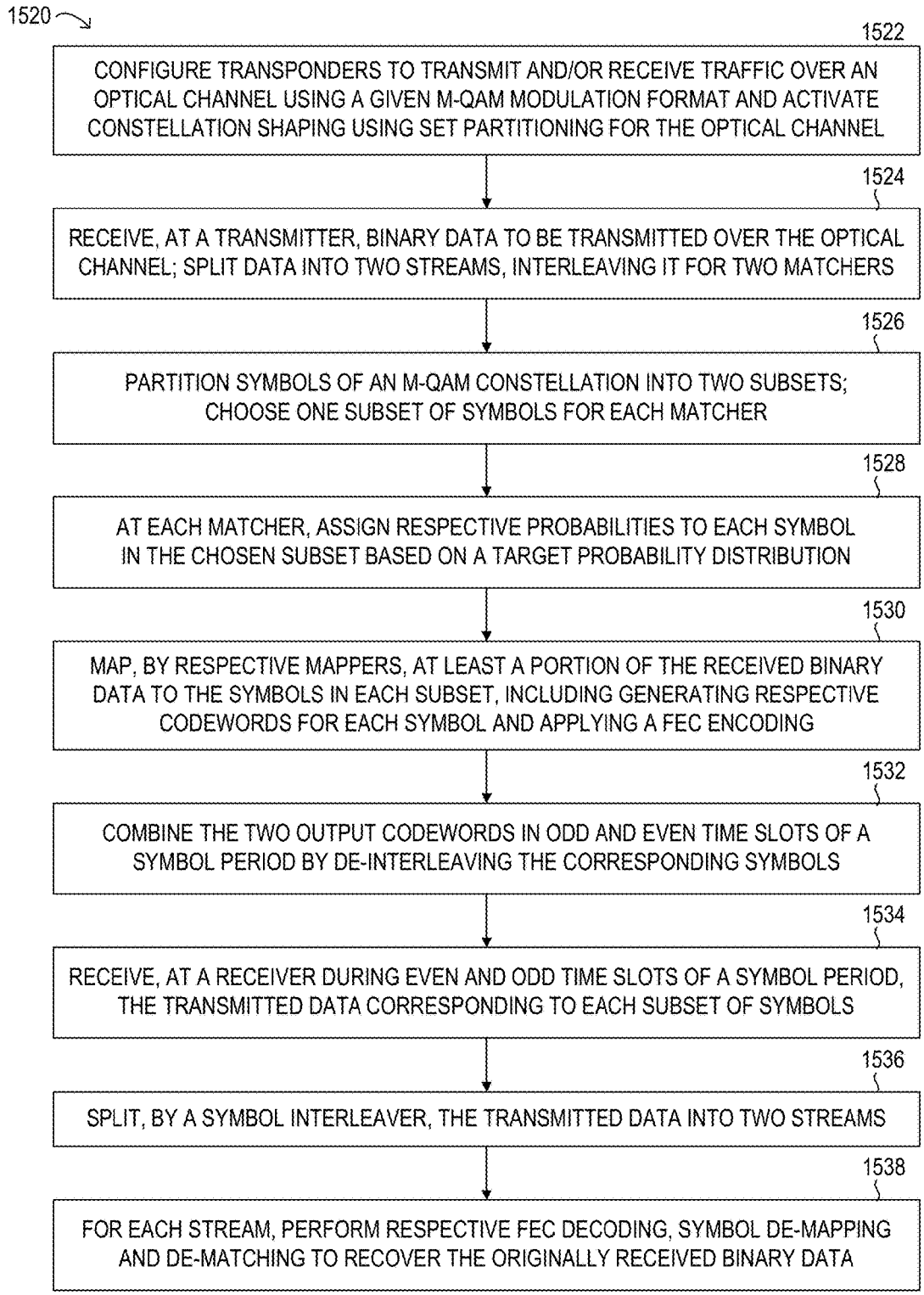

Referring now to FIG. 15B, a block diagram of selected elements of an embodiment of method 1520 for probabilistic constellation shaping using set-partitioned M-QAM, as described herein, is depicted in flowchart form. Method 1520 may be performed using optical transport network 101. More specifically, method 1500 may be performed by elements of an optical transport network such as those illustrated in FIG. 9A (on the transmitter side of a given optical path) and FIG. 14B (on the receiver side of the given optical path). Although method 1520 is described in the singular in terms of an optical channel among a plurality of optical channels, it will be understood that operations in method 1520 may be repeated or duplicated, either in parallel or in serial, for any plurality of optical channels. It is noted that certain operations described in method 1520 may be optional or may be rearranged in different embodiments.

Method 1520 may begin at 1522 by configuring one or more transponders to transmit and/or receive traffic over an optical channel using a given M-QAM modulation format and to activate constellation shaping using set partitioning for the optical channel. For example, in some embodiments, network management system 300 illustrated in FIG. 3 may be used to obtain path information as well as send commands to optical transmitters and optical receivers to configured them for probabilistic constellation shaping using set-partitioned M-QAM, as described above. At 1524, the method may include receiving, at a transmitter, binary data to be transmitted over the optical channel, and splitting the data into two streams, interleaving the data for two matchers.

At 1526, method 1520 may include partitioning symbols of an M-QAM constellation into two subsets of symbols, as described herein, and choosing a respective one of the subsets of symbols for processing by each matcher. At 1528, the method may include, at each matcher, assigning respective probabilities to each symbol in the chosen subset based on a target probability distribution.

At 1530, method 1520 may include mapping, by respective mappers, at least a portion of the received binary data to the symbols in each subset, the mapping including generating respective codewords for each symbol and applying an FEC encoding. In at least some embodiments, the FEC encoding may include the addition of a bit in the least significant position, such as a parity check bit. At 1532, the method may include combining the two output codewords in odd and even time slots of a symbol period by de-interleaving the corresponding symbols.

At 1534, method 1520 may include receiving, at a receiver during even and odd time slots of a symbol period, the transmitted data corresponding to each subset of symbols. At 1536, the method may include splitting, by a symbol interleaver, the transmitted data into two streams. At 1538, method 1520 may include, for each stream, performing respective FEC decoding, symbol de-mapping and de-matching operations to recover the originally received binary data.

In at least some embodiments, the operations shown as 1524 through 1538 may be repeated as more data is received at the transmitter.

While several example techniques for performing set partitioning, matching, FEC encoding and symbol mapping for PS-SP-M-QAM are described in detail herein, in other embodiments, different techniques (or combinations of techniques) may be used for the set partitioning, matching, FEC encoding, and/or symbol mapping in an optical transmission system that implements PS-SP-M-QAM.

While the examples describe set partitioning techniques in which the symbols for an M-QAM modulation format are partitioned into two subsets, in other embodiments, the symbols for an M-QAM modulation format may be partitioned into more than two subsets, after which any suitable techniques for matching, FEC encoding, and/or symbol mapping for PS-SP-M-QAM, including those described herein, may be applied. For example, the symbols for an M-QAM modulation format may be partitioned into four, eight or any other number of subset (e.g., other powers of than two).

As disclosed herein, systems and methods for probabilistic constellation shaping using set-partitioned M-QAM may enable an optical transmission system to achieve an entropy between 1 and $\log_2(M)-1$ bits/symbol, where m is the size of M-QAM. In addition, the use of PS-SP-M-QAM, rather than PS-M-QAM without set partitioning, may enable fine control of spectral efficiency and optical reach in optical transmission systems with improved transmission performance.

While the subject of this specification has been described in connection with one or more exemplary embodiments, it is not intended to limit any claims to the particular forms set forth. On the contrary, any claims directed to the present disclosure are intended to cover such alternatives, modifications and equivalents as may be included within their spirit and scope.

What is claimed is:

1. A method for constellation shaping of M-QAM modulation formats in optical transport networks, the method comprising:
   receiving binary data to be transmitted as an optical signal;
   partitioning symbols of an M-QAM constellation in the complex plane into two non-overlapping subsets of symbols, the two subsets of symbols collectively including all symbols of the M-QAM constellation;
   assigning respective probabilities to each symbol in a first one of the two subsets of symbols dependent on a target probability distribution for the first subset of symbols;
   mapping at least a portion of the received binary data to the symbols in the first subset, the mapping including generating a respective codeword for each symbol in the first subset; and
   in a first symbol period:
     providing data representing the respective codewords mapped to the symbols in the first subset to an optical modulator for transmission; and
     refraining from providing any data representing codewords mapped to the symbols in the second subset to the optical modulator.

2. The method of claim 1, wherein the symbols in the first subset are mirror images of the symbols in the second subset with respect to the I axis or the Q axis in the complex plane.

3. The method of claim 1, wherein:
   each of the codewords comprises a same number of bits; and
   the respective codewords for neighboring symbols in the first subset differ from each other in only one bit position.

4. The method of claim 3, wherein the value in the one bit position represents an error correction encoding.

5. The method of claim 1, further comprising:
   determining a respective codeword for each symbol in the second subset; and
   in a second symbol period, providing the respective codewords for the symbols in the second subset to the optical modulator for transmission.

6. The method of claim 5, wherein, within alternating odd and even time slots, the first symbol period represents an odd time slot and the second symbol period represents an even time slot.

7. The method of claim 5, wherein:
   generating a respective codeword for each symbol in the first subset comprises generating the codeword at a matcher element of a transmitter; and
   determining a respective codeword for each symbol in the second subset comprises re-mapping a codeword generated for a given symbol in the first subset to a given symbol in the second subset that mirrors the given symbol in the first subset with respect to the I axis or the Q axis in the complex plane.

8. The method of claim 5, wherein:
   generating a respective codeword for each symbol in the first subset comprises generating the codeword at a first matcher element of a transmitter; and generating a respective codeword for each symbol in the first subset comprises generating the codeword at a second matcher element of the transmitter.

9. The method of claim 1, further comprising:
receiving, at a coherent receiver in a third symbol period, codewords for the first subset;
receiving, at the coherent receiver in a fourth symbol period, codewords for the second subset;
re-mapping the codewords for the first subset to symbols in the second subset that mirror the symbols in the first subset with respect to the I axis or the Q axis in the complex plane; and
performing one or more of de-mapping, decoding, and de-matching the codewords for the first subset and the second subset to recover the at least a portion of the binary data.

10. The method of claim 1, further comprising:
receiving, at a coherent receiver in a third symbol period, an optical signal representing codewords for the first subset;
receiving, at the coherent receiver in a fourth symbol period, an optical signal representing codewords for the second subset;
directing the codewords for the first subset to a first processing path and the codewords from the second subset to a second processing path;
performing, by elements of the first processing path and the second processing path, one or more of de-mapping, decoding, and de-matching the codewords for the first subset and the codewords for the second subset, respectively; and
combining outputs of the first processing path and the second processing path to recover the at least a portion of the binary data.

11. An optical transport network for constellation shaping of M-QAM modulation formats, the optical transport network comprising:
an optical transmission path, including an optical transmitter and an optical receiver, the optical transmitter configured to:
receive binary data to be transmitted as an optical signal;
partition symbols of an M-QAM constellation of a given M-QAM modulation format in the complex plane into two non-overlapping subsets of symbols, the two subsets of symbols collectively including all symbols of the M-QAM constellation;
assign, by a matcher element, respective probabilities to each symbol in a first one of the two subsets of symbols dependent on a target probability distribution for the first subset of symbols;
map, by a mapper element, at least a portion of the received binary data to the symbols in the first subset, the mapping including generating a respective codeword for each symbol in the first subset; and
in a first symbol period:
provide data representing the respective codewords mapped to the symbols in the first subset to an optical modulator for transmission over the optical channel; and
refrain from providing any data representing codewords mapped to the symbols in the second subset to the optical modulator.

12. The optical transport network of claim 11, wherein the symbols in the first subset are mirror images of the symbols in the second subset with respect to the I axis or the Q axis in the complex plane.

13. The optical transport network of claim 11, wherein:
each of the codewords comprises a same number of bits;
the respective codewords for neighboring symbols in the first subset differ from each other in only one bit position; and
the value in the one bit position represents an error correction encoding.

14. The optical transport network of claim 11, wherein the optical transmitter is further configured to:
determine a respective codeword for each symbol in the second subset; and
in a second symbol period, provide the respective codewords for the symbols in the second subset to the optical modulator for transmission.

15. The optical transport network of claim 14, wherein, within alternating odd and even time slots, the first symbol period represents an odd time slot and the second symbol period represents an even time slot.

16. The optical transport network of claim 14, wherein:
the optical transmitter comprises a matcher element configured to generate the respective codeword for each symbol in the first subset; and
to determine the respective codeword for each symbol in the second subset, the optical transmitter comprises a re-mapping element configured to re-map a codeword generated for a given symbol in the first subset to a given symbol in the second subset that mirrors the given symbol in the first subset with respect to the I axis or the Q axis in the complex plane.

17. The optical transport network of claim 14, wherein the optical transmitter comprises:
a first matcher element configured to generate the respective codeword for each symbol in the first subset; and
a second matcher element configured to generate the respective codeword for each symbol in the second subset.

18. The optical transport network of claim 11, wherein the optical receiver is configured to:
receive, in a third symbol period, codewords for the first subset;
receive, in a fourth symbol period, codewords for the second subset;
re-map the codewords for the first subset to symbols in the second subset that mirror the symbols in the first subset with respect to the I axis or the Q axis in the complex plane; and
perform one or more of de-mapping, decoding, and de-matching the codewords for the first subset and the second subset to recover the at least a portion of the binary data.

19. The optical transport network of claim 11, wherein the optical receiver is configured to:
receive, in a third symbol period, an optical signal representing codewords for the first subset;
receive, in a fourth symbol period, an optical signal representing codewords for the second subset;
direct the codewords for the first subset to a first processing path of the optical receiver and the codewords from the second subset to a second processing path of the optical receiver;
perform, by elements of the first processing path and the second processing path, one or more of de-mapping, decoding, and de-matching the codewords for the first subset and the codewords for the second subset, respectively; and combine outputs of the first processing path and the second processing path to recover the at least a portion of the binary data.

20. The optical transport network of claim 11, further comprising a network management system configured to:
send a first command to the optical transmitter to use the given M-QAM modulation format for an optical channel transmitted over the optical transmission path and to activate constellation shaping using set partitioning for the optical channel; and
send a second command to the optical receiver to use the given M-QAM modulation format for the optical channel and to activate constellation shaping using set partitioning for the optical channel.

* * * * *